United States Patent
Shimamura et al.

(10) Patent No.: US 8,732,363 B2
(45) Date of Patent: May 20, 2014

(54) DATA PROCESSING APPARATUS AND DATA PROCESSING METHOD

(75) Inventors: Masami Shimamura, Hanno (JP);
Akira Ueno, Tokyo (JP); Yoshinobu Tanaka, Tokyo (JP); Takashi Yanada, Tokyo (JP); Ryusuke Tsuchida, Tokyo (JP); Tomoyuki Sengoku, Tokyo (JP)

(73) Assignee: Olympus Corporation, Tokyo (JP)

( * ) Notice: Subject to any disclaimer, the term of this patent is extended or adjusted under 35 U.S.C. 154(b) by 141 days.

(21) Appl. No.: 13/426,712

(22) Filed: Mar. 22, 2012

(65) Prior Publication Data

US 2012/0246364 A1 Sep. 27, 2012

(30) Foreign Application Priority Data

Mar. 24, 2011 (JP) .................................. 2011-066056

(51) Int. Cl.
*G06F 13/38* (2006.01)
*G06F 9/34* (2006.01)

(52) U.S. Cl.
USPC ................. 710/66; 710/62; 710/65; 710/307; 711/201; 712/204

(58) Field of Classification Search
None
See application file for complete search history.

(56) References Cited

U.S. PATENT DOCUMENTS

| | | | | |
|---|---|---|---|---|
| 5,982,459 A * | 11/1999 | Fandrianto et al. | ........ | 348/425.3 |
| 6,597,621 B2 * | 7/2003 | Tsuji et al. | ............... | 365/230.03 |
| 6,711,637 B2 * | 3/2004 | Tateyama | ........................ | 710/65 |
| 7,158,108 B2 * | 1/2007 | Hagino | ............................ | 345/89 |
| 7,475,168 B2 * | 1/2009 | Weber et al. | ..................... | 710/35 |
| 8,482,438 B2 * | 7/2013 | Yanada et al. | .................. | 341/58 |
| 2009/0276106 A1 * | 11/2009 | Doan | ............................... | 701/3 |

FOREIGN PATENT DOCUMENTS

JP 2007-312358 A 11/2007

* cited by examiner

*Primary Examiner* — Michael Sun
(74) *Attorney, Agent, or Firm* — Westerman, Hattori, Daniels & Adrian, LLP

(57) ABSTRACT

A data processing apparatus may include a data conversion unit that arranges the input data in each transfer data in the conversion unit using one transfer data as one transfer unit and a predetermined number of transfer units as one conversion unit when converting a plurality of input data input sequentially into transfer data having a bit number identical to a predetermined bit number of a data bus and sequentially transferring the converted transfer data. The data conversion unit may include a data generation unit and a first data arrangement changing unit. The first data arrangement changing unit may include a bit change number calculating unit, a bit change number analysis unit, a first data sorting unit, and a data coupling unit.

10 Claims, 18 Drawing Sheets

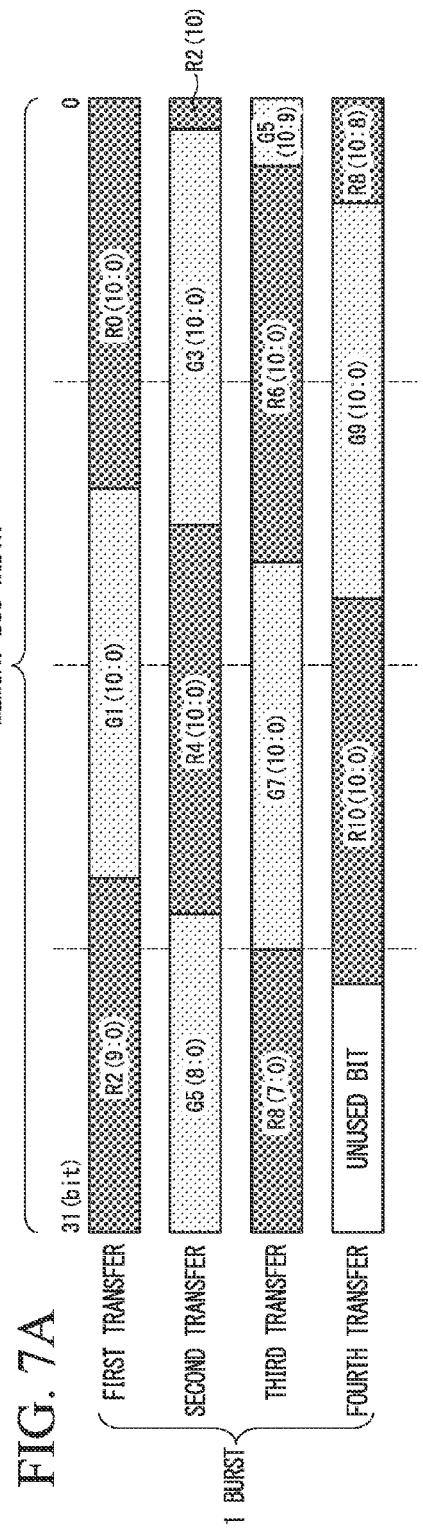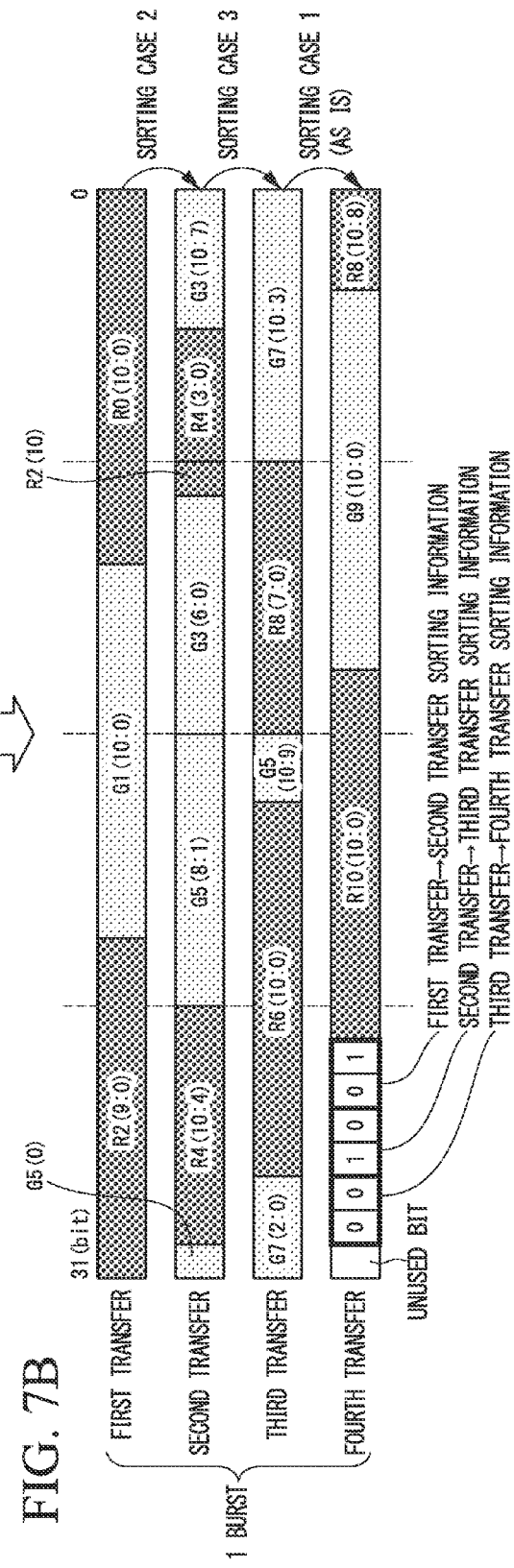

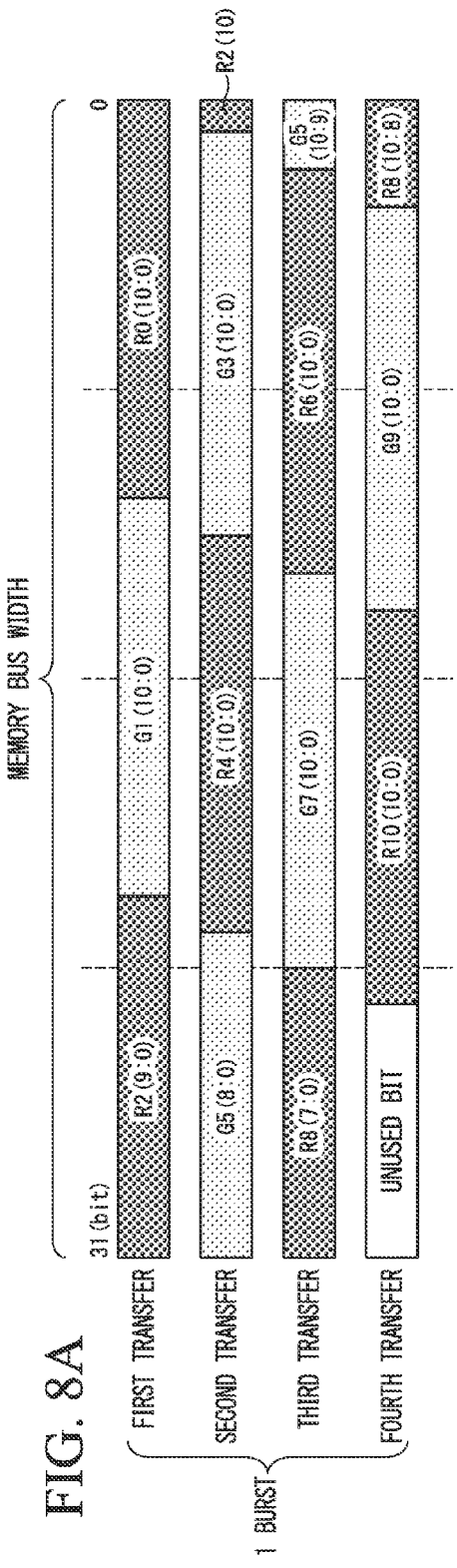
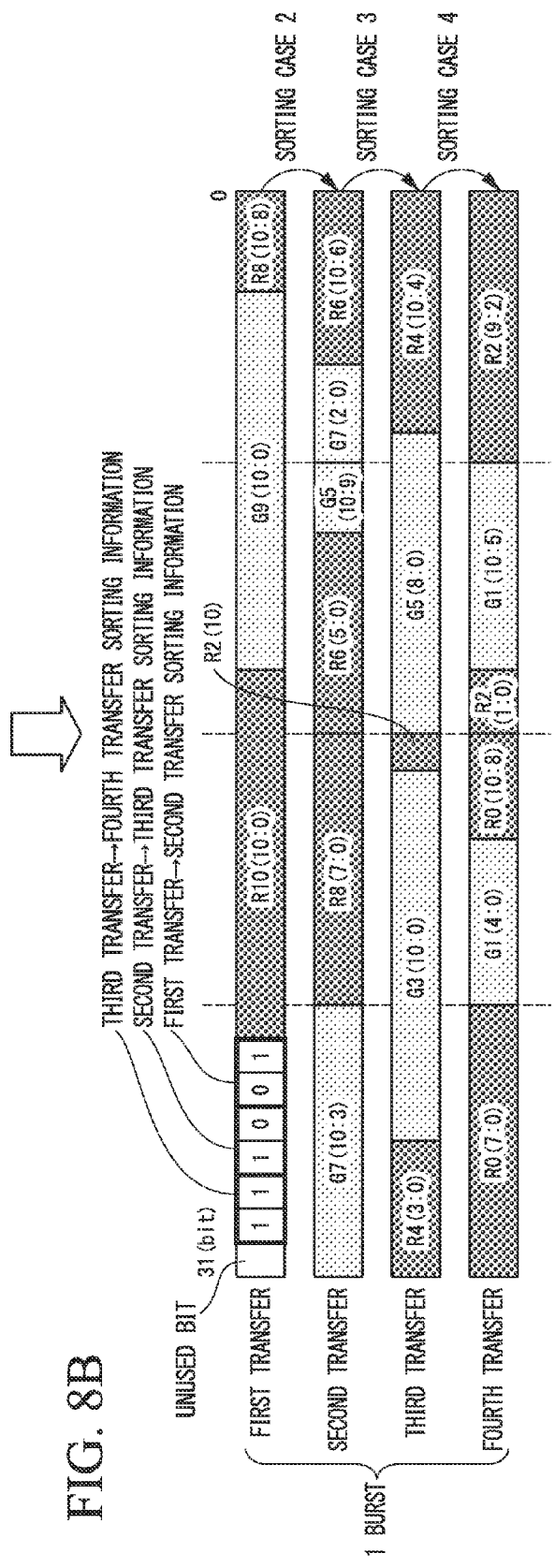

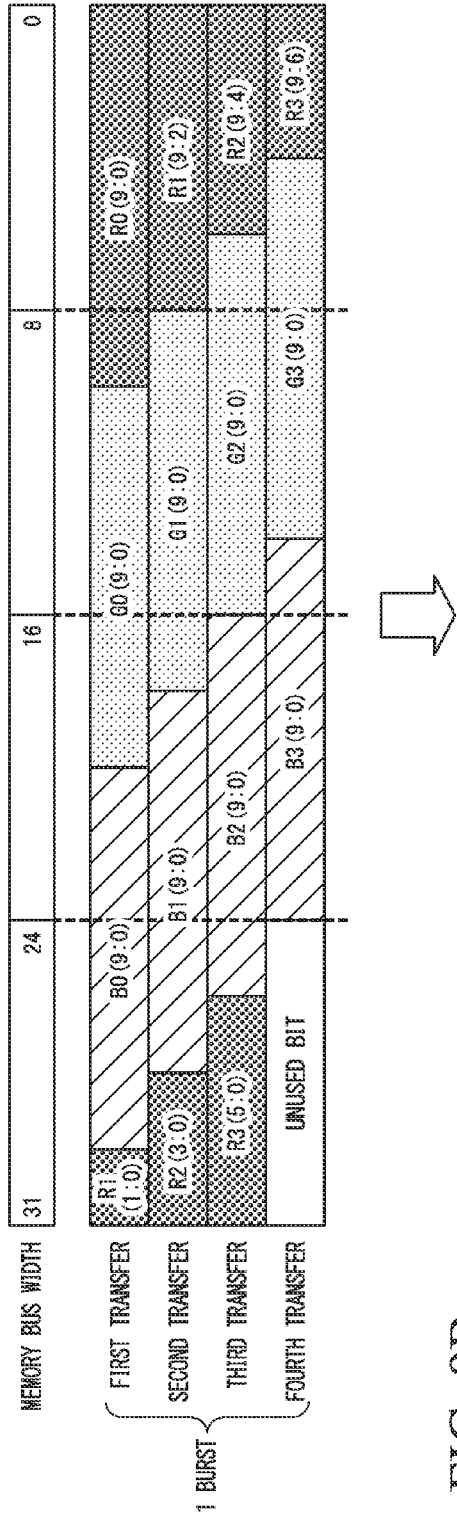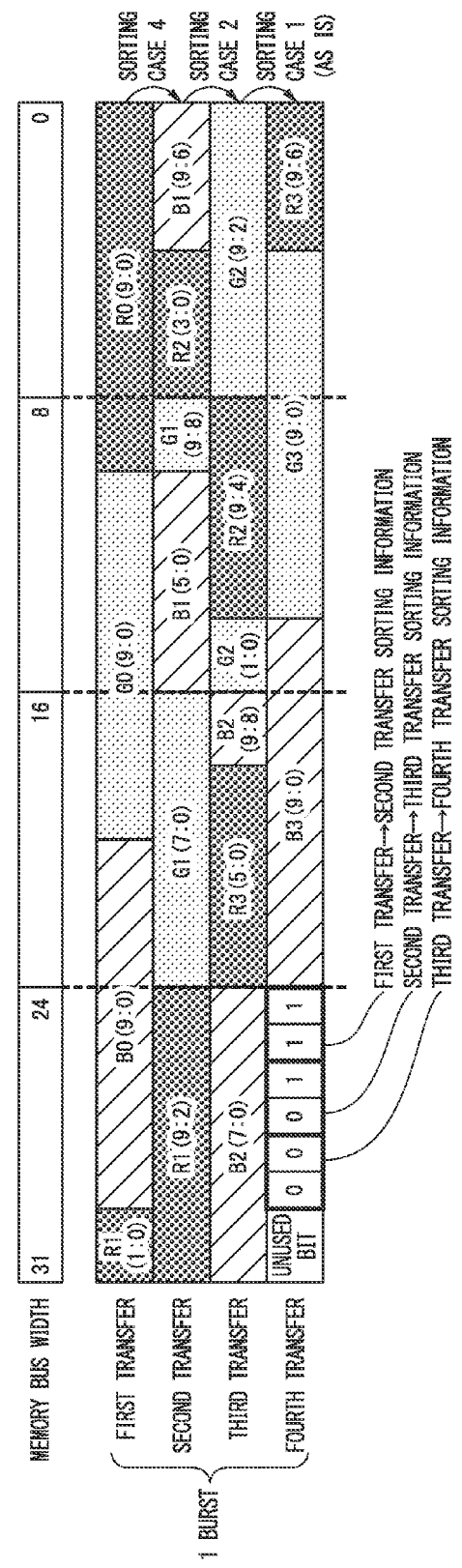
FIG. 9A
FIG. 9B

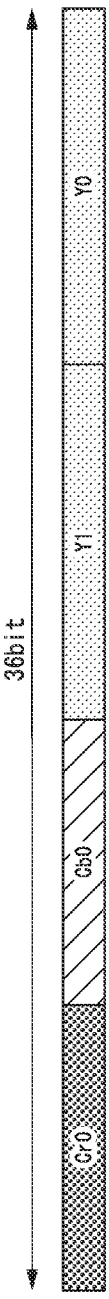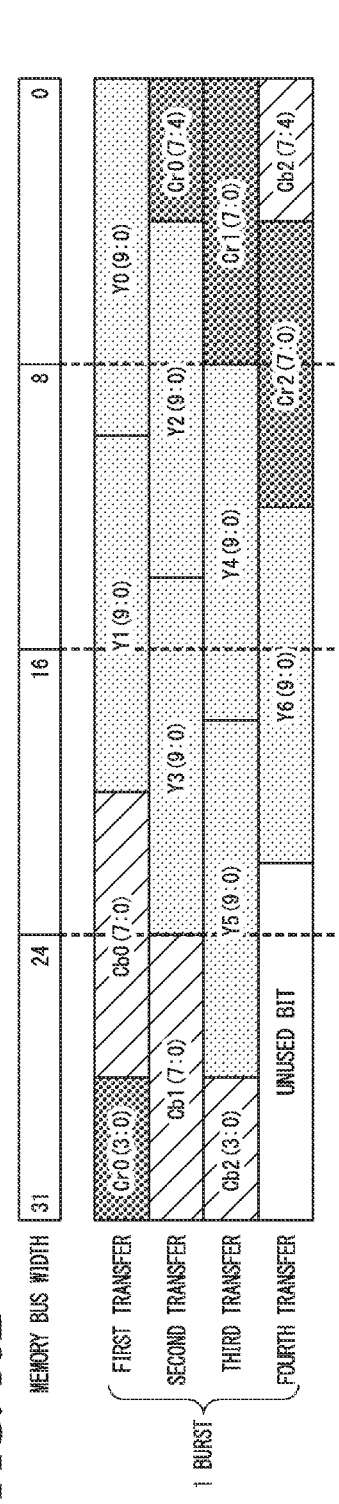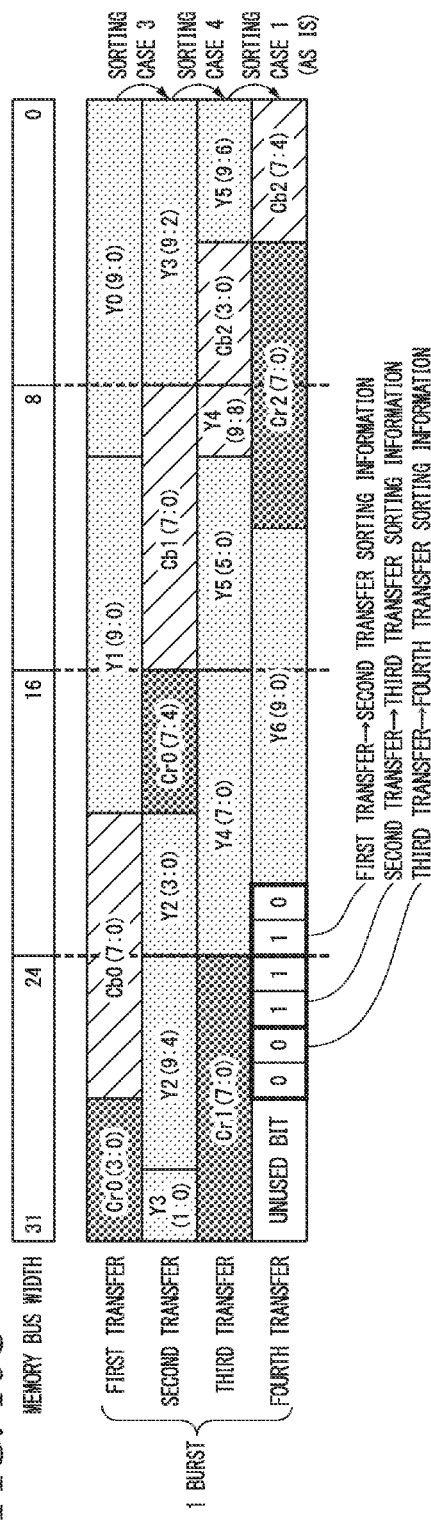

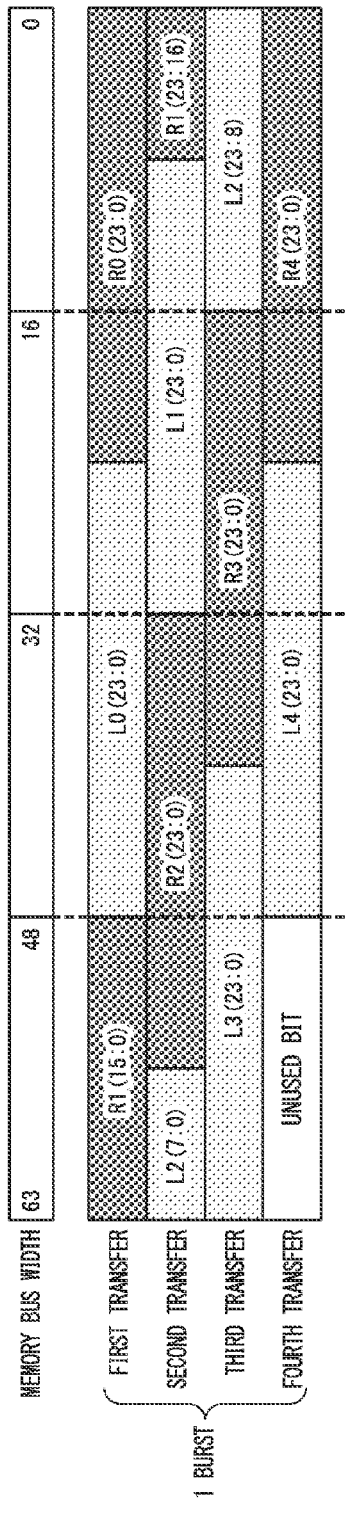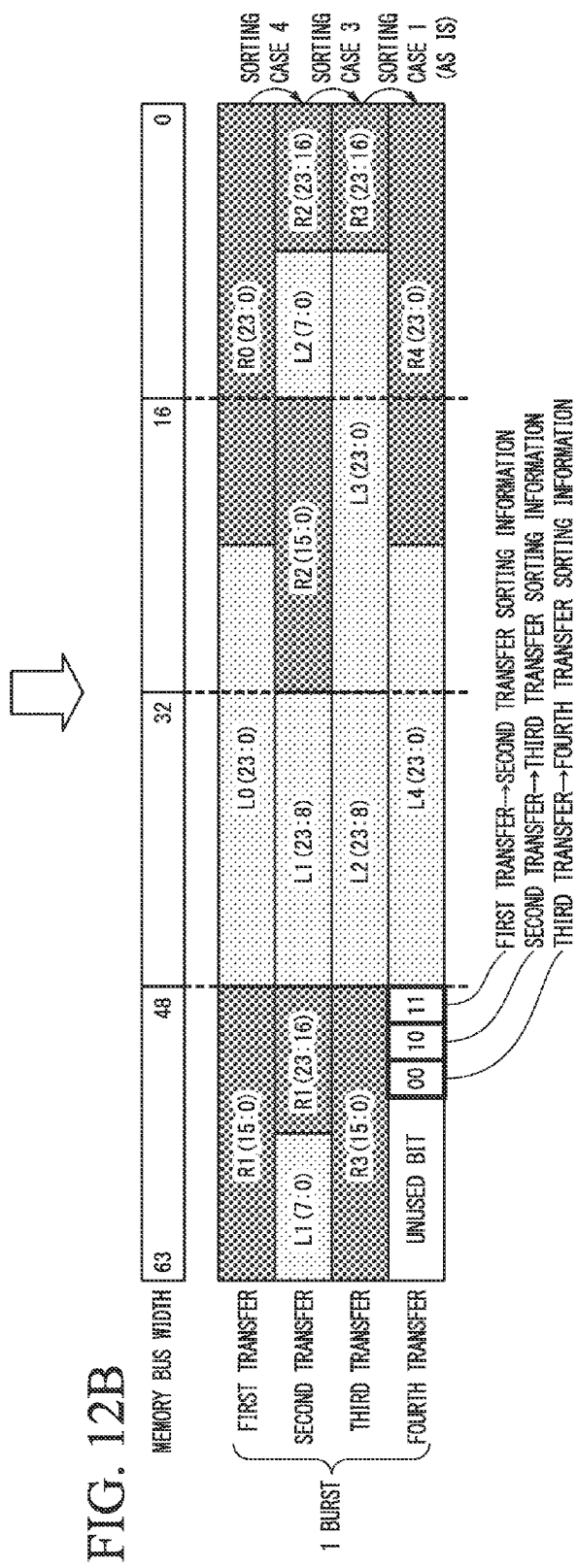

FIG. 14 (Prior Art)

DATA PROCESSING APPARATUS AND DATA PROCESSING METHOD

BACKGROUND OF THE INVENTION

1. Field of the Invention

The present invention relates to a data processing apparatus and a data processing method.

Priority is claimed on Japanese Patent Application No. 2011-066056, filed Mar. 24, 2011, the content of which is incorporated herein by reference.

2. Description of the Related Art

All patents, patent applications, patent publications, scientific articles, and the like, which will hereinafter be cited or identified in the present application, will hereby be incorporated by reference in their entirety in order to describe more fully the state of the art to which the present invention pertains.

An image pickup device, such as a still camera, a video camera, a medical endoscope camera, or an industrial endoscope camera, processes image data containing data of a great number of pixels (hereinafter referred to as "pixel data") with the increase of the number of pixels and speed of the image pickup device. In such an image pickup device, a memory for temporarily storing image data obtained by photographing is used when each processing block in the image pickup device processes the image data. Image data in each processing step is temporarily stored in the memory.

FIG. 13 is a block diagram illustrating a schematic configuration of an image pickup device in accordance with the related art. For example, image data processing in a photographing operation of the image pickup device shown in FIG. 13 is performed in the following order.

(Step 1)

First, an image pickup processing unit, for example, transmits image data obtained by a CCD (Charge Coupled Device) solid-state image pickup device to a memory via an output DMA (Direct Memory Access) unit to temporarily store the image data.

(Step 2)

Subsequently, an image processing unit reads the image data temporarily stored in the memory via an input DMA unit. The image processing unit performs image processing for recording or display on the read image data. The image processing unit then transmits the processed image data to the memory via the output DMA unit to temporarily store the image data.

(Step 3)

Subsequently, a display processing unit reads the image data subjected to image processing for display via an input DMA unit and causes a display device to display the image data.

Thus, in the image pickup device, the preceding processing block temporarily stores the image data in the memory. The subsequent processing block reads the image data stored in the memory and performs a next process. Thus, as respective processing blocks in the image pickup device perform delivery of the image data, which is a processing target, through the memory, processes of the image pickup device are sequentially performed.

In recent years, it has been desirable for an image pickup device such as a still camera, a video camera or the like to be able to be continuously used for a long time. Accordingly, there is a need for a technique for reducing power consumption of an electrical circuit of the image pickup device. One method of reducing the power consumption of the image pickup device includes a method of increasing a transfer rate for image data between each processing block (electrical circuit) and a memory. The increase of the transfer rate for image data, for example, may be realized by increasing a frequency of an operation clock of the image pickup device or shortening a transfer period of time of the image data between the processing block and the memory. This method reduces power consumption due to transfer of the image data by increasing the transfer rate of the image data.

As a technique of shortening a transfer period of time of image data between the processing block and the memory, a packing technique as disclosed in Japanese Unexamined Patent Application, First Publication No. 2007-312358 (hereinafter referred to as Patent Document 1) is known. The packing technique disclosed in Patent Document 1 is a technique of extending a bus width of a data bus used when each pixel data in the image data is transferred to a memory and arranging (packing) a plurality of adjacent pixel data in the data bus to transfer a plurality of pixel data at a single time. Using this technique, the number of data transfers required to transfer all pixel data can be further reduced as compared with conventional data transfer in which pixel data is transferred pixel by pixel, and the period of time for data transfer of the image data can be shortened. FIG. 14 is a diagram illustrating an example of an arrangement of image data. For example, when pixel data as shown in FIG. 14 obtained from a 16×16 Bayer arrangement CCD is transferred to a memory, in the packing technique disclosed in Patent Document 1, pixel data for 4 pixels is one transfer unit, thus reducing a transfer period of the image data to ¼. Accordingly, it is possible to reduce power consumption of an electrical circuit in the image pickup device, unlike a case in which pixel data is transferred to the memory pixel by pixel.

As a technique of further shortening the transfer period of image data, a packing method using burst transfer of DMA is considered. This is a method in which one burst, which is a memory access unit at a prescribed certain number of cycles, is considered a pixel data packing unit. FIGS. 15A and 15B are diagrams illustrating an example of pixel data packing in accordance with the related art. FIG. 15A illustrates a packing method disclosed in Patent Document 1. An example in which the pixel data shown in FIG. 14 is packed is shown in FIG. 15A. FIG. 15B illustrates an example in which the pixel data shown in FIG. 14 is packed in a burst unit. An example in which a bus width (hereinafter referred to as "memory bus width") of a data bus used when the pixel data is transferred to the memory (hereinafter referred to as "memory bus") is 32 bits, and memory access for one cycle in burst transfer (hereinafter referred to as "one transfer") is performed four times, that is, one burst transfer is performed through four transfers, is shown in FIGS. 15A and 15B. An example in which resolution of pixel data of one pixel, that is, a bit number of the pixel data is 9, 10, 12, and 14 from top to bottom, is shown in FIGS. 15A and 15B.

In the packing method disclosed in Patent Document 1 shown in FIG. 15A, pixel data for two pixels per one transfer can be arranged on a memory bus, and pixel data for 8 pixels per one burst can be transferred to the memory. On the other hand, in the burst unit-based packing method shown in FIG. 15B, pixel data for 14, 12, 10, and 9 pixels can be transferred to the memory. In the packing method disclosed in Patent Document 1, since pixel data is arranged (packed) in the memory bus width, that is, in a unit of one transfer, a sum of bit numbers of a plurality of arranged pixel data must not exceed the memory bus width. Accordingly, in the packing method disclosed in Patent Document 1, there are bits to which pixel data cannot be allocated (hereinafter referred to as "unused bits") within the memory bus width. On the other hand, in the burst unit-based packing method, since pixel data is arranged (packed) in units of bursts, even when a sum of bit numbers of a plurality of arranged pixel data exceeds the memory bus width, the pixel data can be arranged (packed) in a next transfer as long as the sum does not exceed one burst, as in FIG. 15B. That is, in the burst unit-based packing method, even when the memory bus width is not an integer times the resolution of pixel data, the pixel data can be arranged (mapped) over one transfer unit, which can reduce the number of unused bits. Accordingly, in the burst unit-based packing method, much pixel data can be transferred to the memory in the same time, that is, the transfer period of time of the image data can be shortened, and the power consumption of the electrical circuit in the image pickup device can be further reduced, as compared with the packing method disclosed in Patent Document 1.

In general, when data change (change (inversion) of data "0"→"1" or "1"→"0") is less, power consumption is known to be lower. Accordingly, reducing the power consumption of the image pickup device by reducing the data change on the memory bus between each processing block (electrical circuit) and a memory in an image pickup device is also considered. FIGS. 16A, 16B, 16C and 16D are diagrams illustrating a relationship between the data change on the data bus (memory bus) between the processing block and the memory in the image pickup device and the power consumption. FIG. 16A illustrates an example in which a bus width of a memory bus between the image pickup processing unit and the memory in the image pickup device shown in FIG. 13 is 32 bits. The data change on the memory bus is schematically shown in FIGS. 16B to 16D. In the example of FIGS. 16A, 16B, 16C and 16D, power consumption is lowest in the case of FIG. 16B in which there is no data change on the memory bus, and highest in the case of FIG. 16D in which there are the most data changes on the memory bus.

It can be seen from the above that if there is a great amount of change in pixel data between two continuous transfers (e.g., pixel data in first and second transfers of each burst transfer shown in FIGS. 15A and 15B) in the burst transfer between each processing block and the memory in the image pickup device, power consumption due to the transfer of the image data increases. That is, the power consumption due to the transfer of the image data varies in proportion to the number of the same bits (bit number) on the memory bus changing between the two transfers.

In general, there is expected to be a small amount of change in data between adjacent pixels in image data, and bits whose values are being inverted are expected to be less than bits whose values are not being inverted when the same bits of each pixel data of adjacent pixels are compared. FIGS. 17A and 17B are diagrams illustrating an example of a data arrangement state in a pixel data packing method in accordance with the related art. Here, when the packing method disclosed in Patent Document 1 and the burst unit-based packing method, which are shown in FIGS. 15A and 15B, are compared with each other, the power consumption due to the transfer of the image data is lower in the packing method disclosed in Patent Document 1 in which the same bits are aligned in pixel data with the same colors, as shown in FIGS. 17A and 17B. Further, FIGS. 17A and 17B show a case in which the bit number of pixel data of one pixel is 9 in the packing method disclosed in Patent Document 1 and the burst unit-based packing method shown in FIGS. 15A and 15B.

More specifically, in the packing method disclosed in Patent Document 1 shown in FIG. 17A, least significant bits of the memory bus shown in a range A are all the same bits (least significant bits) of pixel data with the same colors. On the other hand, in the burst unit-based packing method shown in FIG. 17B, least significant bits of the memory bus shown in a range B are all different bits of pixel data having different colors. It can be seen from this that, when locations of bits of pixel data arranged on the memory bus are made different between two continuous transfers by packing the image data in a burst unit, a change amount of the same bits on the memory bus becomes great and the power consumption due to the transfer of the image data increases.

That is, in the packing method disclosed in Patent Document 1 shown in FIG. 17A, the power consumption due to the transfer of the image data is low, but data transfer efficiency is low. In the burst unit-based packing method shown in FIG. 17B, the data transfer efficiency is low, but the power consumption due to the transfer of the image data is high.

Thus, more pixel data is arranged on the memory bus when packing the pixel data into the burst units. As a result, the transfer period of time of the pixel data can be shortened and the power consumption due to transfer of the image data can be reduced. However, since locations of bits of the pixel data arranged on the memory bus are different between two continuous transfers, sufficient reduction of the power consumption due to the transfer of the image data cannot be obtained.

FIG. 18 is a diagram illustrating another example of a data arrangement state in the pixel data packing method in accordance with the related art. In the packing method disclosed in Patent Document 1, for example, pixel data for 3 pixels can be arranged (packed) in one transfer to pack the pixel data, as shown in FIG. 18. However, in this case, for example, least significant bits of a memory bus shown in a range C are the same bits (least significant bits) of the pixel data, but are pixel data having different colors. Pixel data having different colors is highly likely to be greatly different in value, and even in the packing method disclosed in Patent Document 1, the power consumption due to the transfer of the image data is not reduced due to the pixel data arrangement in one transfer.

SUMMARY

The present invention provides a data processing apparatus and a data processing method capable of reducing power consumption due to data transfer while maintaining data transfer efficiency.

A data processing apparatus may include: a data conversion unit that arranges the input data in each transfer data in the conversion unit using one transfer data as one transfer unit and a predetermined number of transfer units as one conversion unit when converting a plurality of input data input sequentially into transfer data having a bit number identical to a predetermined bit number of a data bus and sequentially transferring the converted transfer data. The data conversion unit may include: a data generation unit configured to generate first transfer data in which the input data is sequentially arranged in the data bus; and a first data arrangement changing unit configured to divide the bit width of the data bus into a plurality of unit bits having a predetermined bit number, generate conversion data obtained by sorting the arrangement of data arranged in the first transfer data for every unit bit, and output the generated conversion data and sorting information indicating the sorted arrangement of data in the conversion data as the transfer data in the data conversion unit. The first data arrangement changing unit may include: a bit change number calculating unit configured to compare a value of each bit in the conversion data output at an n-th (n is a natural number of 1 or more) time from the first data arrangement changing unit with a value of each bit in the first transfer data input at an (n+1)-th time, and output, for every unit bit, the number of bits based on the comparison result set as a bit change number; a bit change number analysis unit configured to determine whether or not the data in the first transfer data input at the (n+1)-th time is sorted in units of the unit bit based on the bit change number for every unit bit, and output the determination result; a first data sorting unit configured to sort the data in the first transfer data at the (n+1)-th time in units of the unit bit and generate sorting data based on the determination result; and a data coupling unit configured to generate coupling data obtained by coupling information indicating the determination result as the sorting information, in the position of a predetermined unused bit of the sorting data containing the unused bit in the sorting data in which data is not arranged, and output any one of the sorting data and the generated coupling data as the conversion data in the first data arrangement changing unit.

The bit change number calculating unit: divides the conversion data output at the n-th time into first reference data and second reference data for every bit number of the unit bits; divides the first transfer data input at the (n+1)-th time into first comparison target data and second comparison target data for every bit number of the unit bits; and outputs a first bit change number obtained by comparing the first comparison target data with the first reference data, a second bit change number obtained by comparing the second comparison target data with the first reference data, a third bit change number obtained by comparing the first comparison target data with the second reference data and a fourth bit change number obtained by comparing the second comparison target data with the second reference data.

The bit change number analysis unit may determine an arrangement of data for every unit bit in the first transfer data input at the (n+1)-th time, in which the number of bits whose values become different values when a value of each bit of the conversion data output at the n-th time is changed into a value of each bit of the first transfer data input at the (n+1)-th time, based on the first, second, third and fourth bit change numbers input from the bit change number calculating unit, and determines whether or not the arrangement of data in the first transfer data input at the (n+1)-th time is sorted in units of the unit bit based on the determined data arrangement.

Combinations of arrangement positions of the unit bits on the data bus when the arrangement of data in the first transfer data input at the (n+1)-th time is sorted in units of the unit bit may be predetermined The bit change number analysis unit may select, from the predetermined combinations of the arrangement positions, a combination of the arrangement positions of data for every unit bit in the first transfer data input at the (n+1)-th time, in which the number of bits whose values become different values when a value of each bit of the conversion data output at the n-th time is changed into a value of each bit of the first transfer data input at the (n+1)-th time, based on the first, second, third and fourth bit change numbers input from the bit change number calculating unit, and outputs information of the selected combination of the arrangement positions as the determination result of determining whether or not the arrangement of data in the first transfer data input at the (n+1)-th time is sorted in units of the unit bit.

When the transfer data is output in the conversion unit, an output order of the conversion data output as the transfer data may be predetermined. The data coupling unit may output any one of the sorting data and the coupling data as the conversion data, based on the predetermined output order of the conversion data.

A data processing apparatus may include: a data inverse conversion unit configured to convert a plurality of input data into transfer data having a bit number identical to a predetermined bit number of a data bus, sequentially inverse-convert transfer data sequentially transferred for every conversion unit using one transfer data as one transfer unit and the transfer unit of a predetermined number as one conversion unit, and restore the inverse-converted transfer data to the plurality of original input data. The data inverse conversion unit may include: a second data arrangement changing unit configured to generate first transfer data in which the data processing apparatus as a transfer source of the transfer data sequentially arranges the input data as the transfer data in the data bus, divide the bit width of the data bus into a plurality of unit bits having a predetermined bit number, generate conversion data obtained by sorting an arrangement of data arranged in the first transfer data for every unit bit, and return the conversion data to the first transfer data by sorting the arrangement of data arranged in the conversion data to the arrangement position of the original input data for each unit bit so that the generated conversion data and sorting information indicating the arrangement of the sorted data in the conversion data is input from the data bus as the transfer data from the data processing apparatus as the transfer source of the transfer data to restore the arrangement of data arranged in the input conversion data to the original arrangement; and a data restoring unit configured to restore, to the input data, the input data contained in the first transfer data of which arrangement is returned to the original arrangement of the input data. The second data arrangement changing unit may include: a data storage unit configured to store all the transfer data contained in the conversion unit as the conversion data by sequentially storing the transfer data sequentially transferred for every conversion unit whenever the transfer data is transferred; a sorting information storage unit configured to store sorting information coupled in a predetermined bit position of any one of the transfer data when the data processing apparatus as the transfer source of the transfer data sorts the arrangement of data arranged in the first transfer data for every unit bit; and a second data sorting unit configured to sequentially generate the first transfer data in which data in the conversion data stored in the data storage unit is sorted in the original arrangement in units of the unit bit, based on the sorting information stored in the sorting information storage unit.

Combinations of arrangement positions of the unit bits on the data bus when the arrangement of data in the conversion data is sorted in the original arrangement in units of the unit bit may be predetermined. The second data sorting unit may select a combination of arrangement positions corresponding to the conversion data to be currently processed from the predetermined combinations of arrangement positions based on information on the combinations of arrangement positions contained in the sorting information, and generates the first transfer data obtained by sorting the data in the conversion data to be currently processed to the original arrangement based on the selected combination of arrangement positions.

When the data processing apparatus as the transfer source of the transfer data outputs the transfer data in the conversion unit, an output order of the conversion data output as the transfer data may be predetermined. The second data sorting unit may sequentially select the conversion data stored in the data storage unit, based on the predetermined output order of the conversion data, so that the order of the generated first transfer data becomes the original order of the first transfer data generated by the data processing apparatus as the transfer source of the transfer data, and sequentially generates the first transfer data obtained by sorting the data in the selected conversion data to the original arrangement.

A data processing method may include: a data conversion step of, when converting a plurality of input data input sequentially into transfer data having a bit number identical to a predetermined bit number of a data bus and sequentially transferring the converted transfer data, arranging the input data in each transfer data in the conversion unit using one transfer data as one transfer unit and a predetermined number of transfer units as one conversion unit. The data conversion step may include: a data generation step of generating first transfer data in which the input data is sequentially arranged in the data bus; and a first data arrangement changing step of dividing the bit width of the data bus into a plurality of unit bits having a predetermined bit number, generating conversion data obtained by sorting the arrangement of data arranged in the first transfer data for every unit bit, and outputting the generated conversion data and sorting information indicating the sorted arrangement of data in the conversion data as the transfer data in the data conversion unit. The first data arrangement changing step may include: a bit change number calculating step of comparing a value of each bit in the conversion data output at an n-th (n is a natural number of 1 or more) time from the first data arrangement changing unit with a value of each bit in the first transfer data input at an (n+1)-th time, the number of bits based on the compared result is set to a bit change number, and outputting, for every unit bit, the number of bits based on the comparison result set as a bit change number; a bit change number analysis step of determining whether or not the data in the first transfer data input at the (n+1)-th time is sorted in units of the unit bit based on the bit change number for every unit bit, and outputting the determination result; a first data sorting step of generating the data in the first transfer data as sorting data sorted in units of the unit bit based on the determination result; and a data coupling step of generating coupling data obtained by coupling information indicating the determination result as the sorting information, in the position of a predetermined unused bit of the sorting data containing the unused bit in the sorting data in which data is not arranged, and outputting any one of the sorting data and the generated coupling data as the conversion data in the first data arrangement changing unit.

A data processing method may include: a data inverse conversion step of converting a plurality of input data into transfer data having a bit number identical to a predetermined bit number of a data bus, sequentially inverse-converting transfer data sequentially transferred for every conversion unit using one transfer data as one transfer unit and the transfer unit of a predetermined number as one conversion unit, and restoring the inverse-converted transfer data to the plurality of original input data. The data inverse conversion step may include: a second data arrangement changing step of generating first transfer data in which the data processing apparatus as a transfer source of the transfer data sequentially arranges the input data as the transfer data in the data bus, divides the bit width of the data bus into a plurality of unit bits having a predetermined bit number, generates conversion data obtained by sorting an arrangement of data arranged in the first transfer data for every unit bit, and returns the conversion data to the first transfer data by sorting the arrangement of data arranged in the conversion data to the arrangement position of the original input data for each unit bit so that the generated conversion data and sorting information indicating the arrangement of the sorted data in the conversion data is input from the data bus as the transfer data from the data processing apparatus as the transfer source of the transfer data so as to restore the arrangement of data arranged in the input conversion data to the original arrangement; and a data restoration step of restoring, to the input data, the input data contained in the first transfer data of which arrangement is returned to the original arrangement of the input data. The second data arrangement changing step may include: a data storage step of storing all the transfer data contained in the conversion unit as the conversion data by sequentially storing the transfer data sequentially transferred for every conversion unit whenever the transfer data is transferred; a sorting information storage step of storing sorting information coupled in a predetermined bit position of any one of the transfer data when the data processing apparatus as the transfer source of the transfer data sorts the arrangement of data arranged in the first transfer data for every unit bit; and a second data sorting step of sequentially generating the first transfer data in which data in the conversion data stored in the data storage unit is sorted in the original arrangement in units of the unit bit, based on the sorting information stored in the sorting information storage unit.

According to the present invention, it is possible to reduce power consumption due to data transmission while maintaining data transfer efficiency.

BRIEF DESCRIPTION OF THE DRAWINGS

The above features and advantages of the present invention will be more apparent from the following description of certain preferred embodiments taken in conjunction with the accompanying drawings, in which:

FIGS. 7A and 7B are diagrams illustrating an example of the packed data arranged by the data conversion unit included in the image pickup device in accordance with the first preferred embodiment of the present invention;

FIGS. 8A and 8B are diagrams illustrating an example of packed data of which an output order is changed by the data conversion unit included in the image pickup device in accordance with the first preferred embodiment of the present invention;

FIGS. 9A and 9B are diagrams illustrating an embodiment in which the method of arranging data performed by the data conversion unit included in the image pickup device in accordance with the first preferred embodiment of the present invention is applied to other image data;

FIGS. 10A, 10B and 10C are diagrams illustrating an example in which the method of arranging data performed by the data conversion unit included in the image pickup device in accordance with the first preferred embodiment of the present invention is applied to a different form of image data;

FIGS. 12A and 12B are diagrams illustrating an example in which the method of arranging data performed by the data conversion unit included in the image pickup device in accordance with the first preferred embodiment of the present invention is applied to a different form of data;

FIG. 14 is a diagram illustrating an example of an arrangement of image data;

DETAILED DESCRIPTION OF THE PREFERRED EMBODIMENTS

The present invention will be now described herein with reference to illustrative preferred embodiments. Those skilled in the art will recognize that many alternative preferred embodiments can be accomplished using the teaching of the present invention and that the present invention is not limited to the preferred embodiments illustrated for explanatory purpose.

Figure 1:
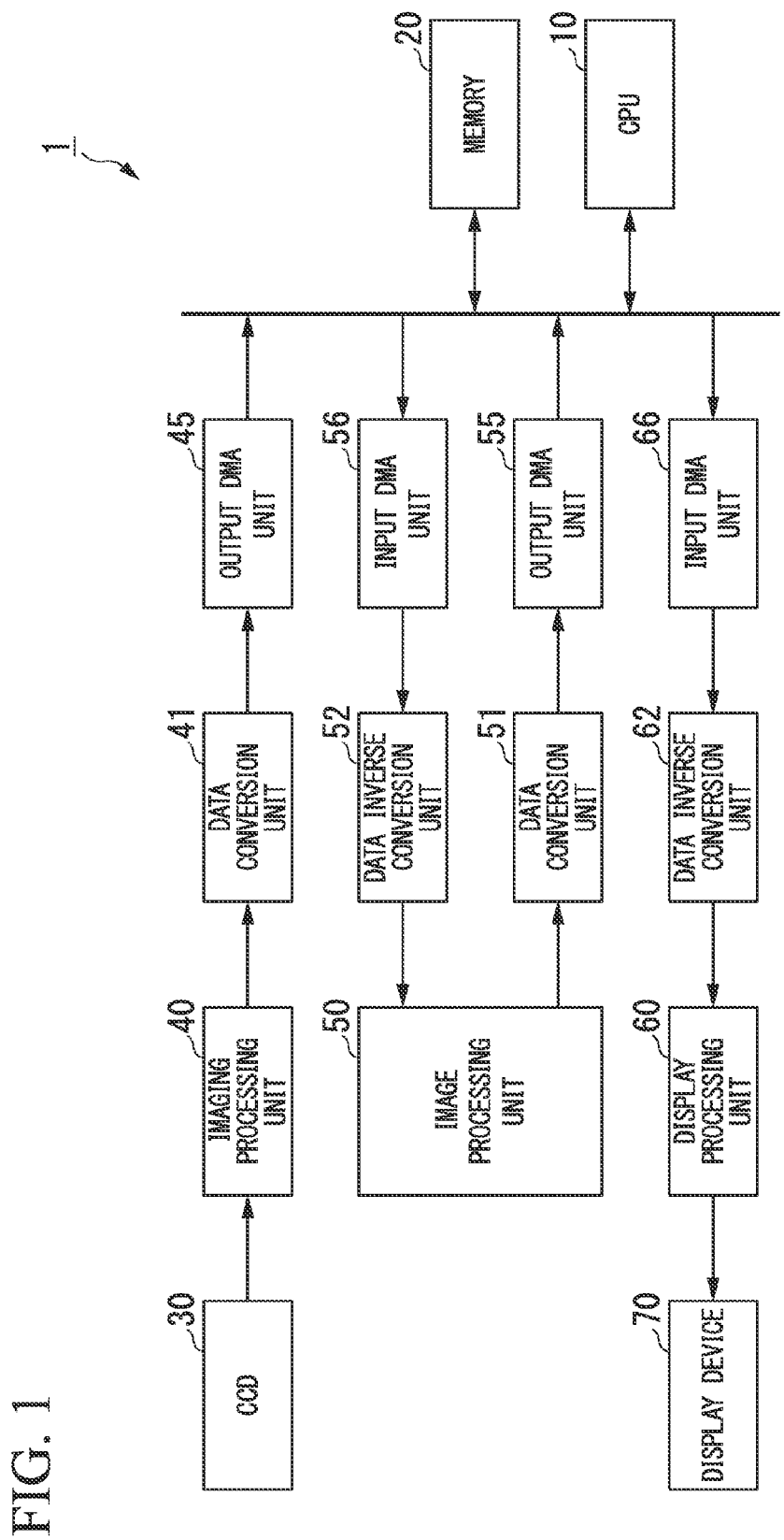
FIG. 1 is a block diagram illustrating a schematic configuration of an image pickup device in accordance with a first preferred embodiment of the present invention.

FIG. 1 is a block diagram illustrating a schematic configuration of an image pickup device in accordance with a first preferred embodiment of the present invention. The image pickup device 1 shown in FIG. 1 includes a CPU 10, a memory 20, a CCD 30, an image pickup processing unit 40, an image processing unit 50, a display processing unit 60, a display device 70, data conversion units 41 and 51, data inverse-conversion units 52 and 62, output DMA units 45 and 55, and input DMA units 56 and 66. The image pickup device 1 has a function of recording image data obtained through photographing. However, for convenience of a description, a case in which image data obtained through photographing is displayed will be described hereinafter. Only a connection of a memory bus that is a data bus associated with pixel data delivery between respective components (processing blocks) in the image pickup device 1 is shown in FIG. 1.

The CPU 10 is a control device that performs overall control of the image pickup device 1.

The memory 20, for example, is a memory such as a DRAM (Dynamic Random Access Memory) for temporarily storing pixel data processed by each processing block in the image pickup device 1. Pixel data in each processing step of each processing block in the image pickup device 1 is temporarily stored in the memory 20.

The CCD 30, for example, is a solid-state image pickup device having a Bayer arrangement for converting incident subject light into an image signal. The CCD 30 outputs a subject pixel signal to the image pickup processing unit 40.

The image pickup processing unit 40 performs prescribed signal processing on the pixel signal input from the CCD 30 to generate image data.

The image processing unit 50 performs various image processing in the image pickup device 1 on the image data generated by the image pickup processing unit 40 to generate image data.

The display processing unit 60 converts the image data image-processed by the image processing unit 50 into display data according to the display device 70. The display processing unit 60 outputs the converted display data to the display device 70.

The display device 70, for example, is a display device such as a liquid crystal display for displaying the display data.

In the image pickup device 1 in accordance with the first preferred embodiment of the present invention, a pixel signal for a subject captured by the CCD 30 is processed by the image pickup processing unit 40, the image processing unit 50, and then the display processing unit 60, and displayed on the display device 70. In this case, the image data in each processing step is delivered between the respective processing blocks via the memory 20. The data conversion units 41 and 51, the data inverse-conversion units 52 and 62, the output DMA units 45 and 55, and the input DMA units 56 and 66 in the image pickup device 1 are processing blocks associated with delivery of the image data in each processing step.

The data conversion unit 41 or 51 arranges respective pixel data in the image data input from a preceding processing block (the image pickup processing unit 40 or the image processing unit 50 in accordance with the first preferred embodiment of the present invention shown in FIG. 1) in respective bits of the memory bus using a prescribed arranging (packing) method. Configurations of the data conversion units 41 and 51 and a pixel data packing method in the data conversion units 41 and 51 will be described in detail later.

The output DMA unit 45 or 55 writes (stores) the image data consisting of the pixel data packed in respective bits of the memory bus by the data conversion unit 41 or 51 to the memory 20 through DMA access.

The input DMA unit 56 or 66 reads the image data stored in the memory 20 through DMA access and outputs the read image data to the data inverse-conversion unit 52 or 62.

The data inverse-conversion unit 52 or 62 restores the pixel data contained in the image data input from the DMA unit 56 or 66 to original image data using a method reverse to the prescribed arranging (packing) method and outputs the original image data to a subsequent processing block (the image processing unit 50 or the display processing unit 60 in accordance with the first preferred embodiment of the present invention shown in FIG. 1). Configurations of the data inverse-conversion units 52 and 62 will be described in detail later.

Here, image data processing in the image pickup device 1 shown in FIG. 1 will be described. In a photographing operation in the image pickup device 1, image data processing is performed in the following order.

(Step 1)

First, the image pickup processing unit 40 performs prescribed signal processing on a pixel signal for a subject captured by the CCD 30 to generate image data (e.g., image data according to a pixel arrangement of the CCD 30). The image pickup processing unit 40 transfers the generated image data to the memory 20 via the data conversion unit 41 and the output DMA unit 45 and temporarily stores the image data.
(Step 2)

Subsequently, the image processing unit 50 reads the image data temporarily stored in the memory 20 via the input DMA unit 56 and the data inverse-conversion unit 52. The image processing unit 50 performs image processing for recording or display on the read image data to generate image data (e.g., RGB data, or YCbCr data having a YC422 dot sequential format). Then, the image processing unit 50 transfers the generated image data to the memory 20 via the data conversion unit 51 and the output DMA unit 55 again and temporarily stores the image data.
(Step 3)

Subsequently, the display processing unit 60 reads the image data subjected to image processing for displaying by the image processing unit 50 or image data for OSD (On-Screen Display) display separately stored in the memory 20, via the input DMA unit 66 and the data inverse-conversion unit 62, and causes the display device 70 to display the image data.

When the image pickup device 1 records the image data obtained through photographing, a recording processing unit for performing an image data recording process, which is not shown, reads the image data subjected to image processing for recording by the image processing unit 50 via an input DMA unit and a data inverse-conversion unit, which are not shown, and records the read image data for recording in an image data recording unit, such as a memory card, that is not shown. Further, when the image pickup device 1, for example, has a function of inputting/outputting sound, an audio processing unit for performing audio processing, which is not shown, stores audio data upon photographing in the memory 20 via a data conversion unit and an output DMA unit that are not shown. Further, the audio processing unit reads audio data stored in the memory 20 via an input DMA unit and a data inverse-conversion unit that are not shown, and causes a sound output unit such as a speaker, which is not shown, to output sound according to the read audio data.

Next, data conversion units and data inverse conversion units in an image device 1 will be described. As described above, a data conversion unit 41 and a data conversion unit 51 merely have different preceding and subsequent processing blocks connected thereto. More specifically, as shown in FIG. 1, the data conversion unit 41 is disposed between a preceding image capturing processing unit 40 and a subsequent output DMA unit 45, and the data conversion unit 51 is disposed between a preceding image processing unit 50 and a subsequent output DMA unit 55. Therefore, the data conversion unit 41 and the data conversion unit 51 merely have different data forms (formats) of image data input/output thereto/therefrom. In the following description, the data conversion unit 41 will be representatively described.

As described above, a data inverse conversion unit 52 and a data inverse conversion unit 62 merely have different preceding and subsequent processing blocks connected thereto. More specifically, as shown in FIG. 1, the data inverse conversion unit 52 is disposed between a preceding input DMA unit 56 and the preceding image processing unit 50, and the data inverse conversion unit 62 is disposed between a preceding input DMA unit 66 and a subsequent display processing unit 60. Therefore, the data inverse conversion unit 52 and the data inverse conversion unit 62 merely have different data forms (formats) of image data input/output thereto/therefrom. In the following description, the data inverse conversion unit 52 will be representatively described.

Figure 2A:
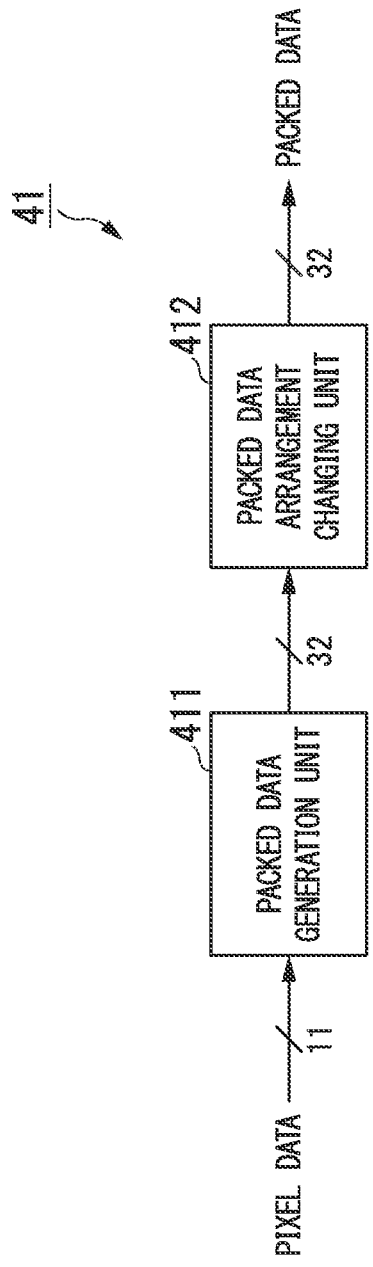
FIGS. 2A and 2B are block diagrams illustrating schematic configurations of a data conversion unit and a data inverse conversion unit included in the image pickup device in accordance with the first preferred embodiment of the present invention.
Figure 2B:
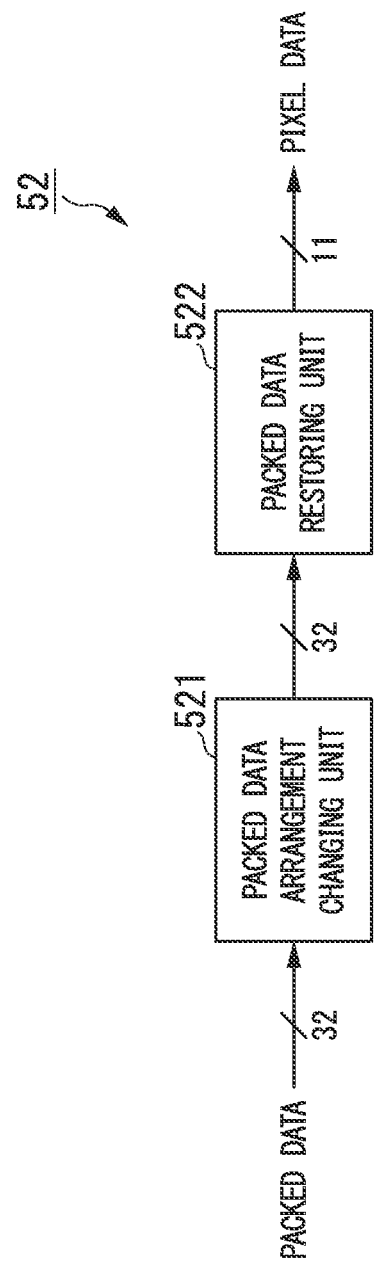

FIGS. 2A and 2B are block diagrams illustrating schematic configurations of the data conversion unit 41 and the data inverse conversion unit 52 included in the image pickup device 1 in accordance with the first preferred embodiment of the present invention, respectively. As shown in FIG. 2A, the data conversion unit 41 includes a packed data generation unit 411 and a packed data arrangement changing unit 412. As shown in FIG. 2B, the data inverse conversion unit 52 includes a packed data arrangement changing unit 521 and a packed data restoring unit 522.

Figure 14:
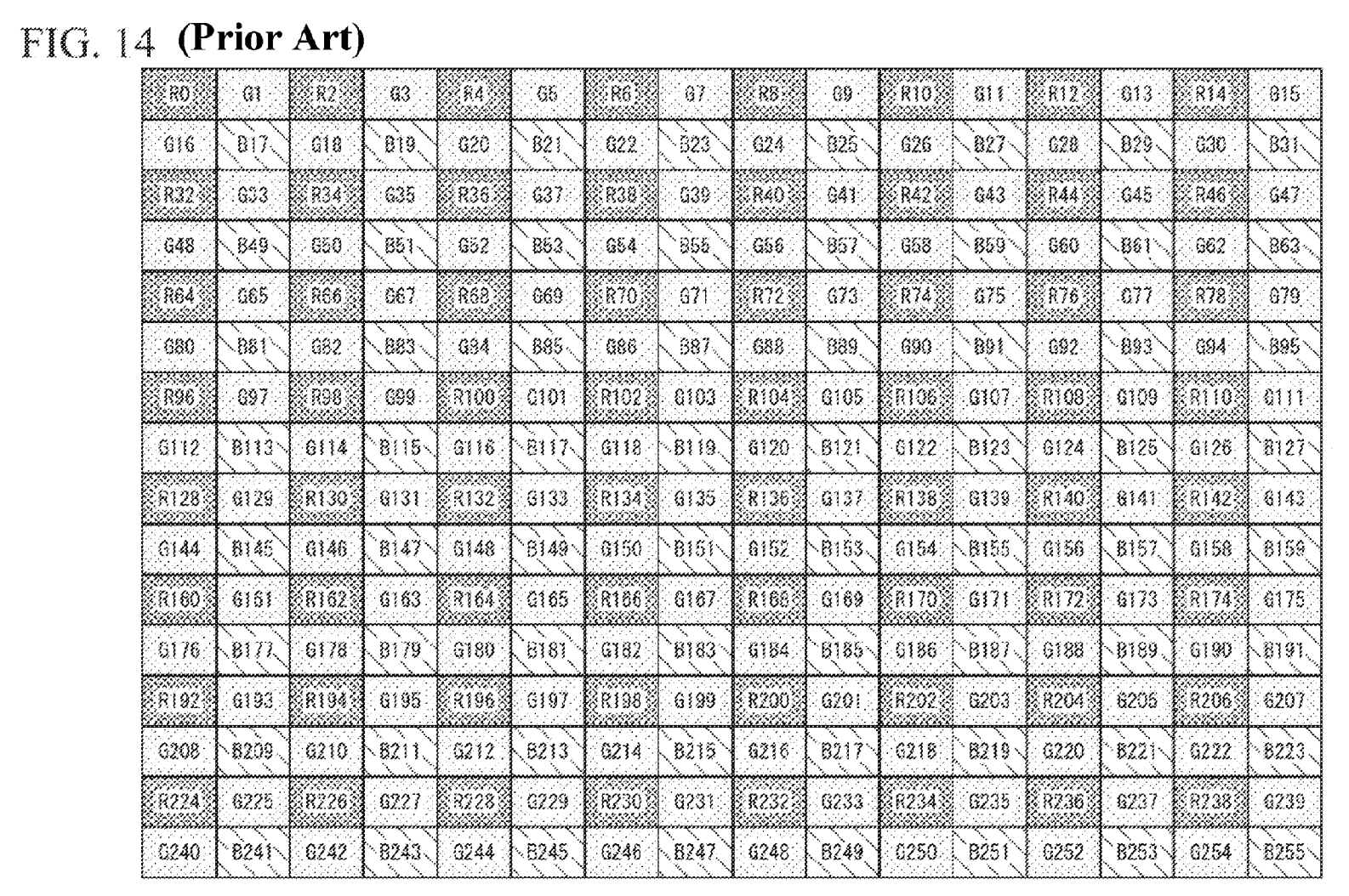

First, the data conversion unit 41 shown in FIG. 2A will be described. In the following description, image data having a Bayer array of 16 rows×16 columns (hereinafter referred to as "Bayer data") as shown in FIG. 14 is input to the data conversion unit 41. The packing unit of each pixel data in the Bayer data is set to four transfers, and the four transfers are set to one burst transfer unit. That is, a case in which one burst is used as the packing unit of pixel data will be described. Also, it will be described that the bit number of each pixel data in the Bayer data is 11 and the bus width of a memory bus (memory bus width) is 32 bits.

The data conversion unit 41 arranges data of each bit of the 11-bit pixel data input from the image capturing processing unit 40 in each bit on the memory bus, using any one of predetermined packing methods, which will be described later, to generate 32-bit packed data. Then, the data conversion unit 41 sequentially outputs the generated packed data, for example, based on a data enable signal (not shown) input from the output DMA unit 45. The data enable signal is a signal indicating a timing at which the packed data is transferred when the output DMA unit 45 performs burst transfer.

The packed data generation unit 411 sequentially arranges each bit data of the input pixel data in each bit of a data bus corresponding to the memory bus (the data bus corresponds to each bit of the memory bus, and hence is referred to as a "memory bus" in the following description). The packed data generation unit 411 outputs, to the packed data arrangement changing unit 412, packed data having a bit number (32 bits in FIG. 2A) of the memory bus width in which the pixel data is sequentially arranged (hereinafter referred to as "transferred packed data"). The method of arranging the pixel data in the memory bus in the packed data generation unit 411 is identical to the conventional packing method in a burst unit, and therefore, its detailed description will be omitted.

The packed data arrangement changing unit 412 changes the data arrangement in the 32-bit transferred packed data input from the packed data generation unit 411, and generates 32-bit packed data finally output by the data conversion unit 41.

More specifically, the packed data arrangement changing unit 412 sorts the memory bus width of the transferred packed data input from the packed data generation unit 411 into units (hereinafter referred to as "sorting units") having a predetermined bit number (e.g., 8 bits: 1 byte). The packed data arrangement changing unit 412 calculates a change rate of each bit (hereinafter referred to as a "bit change rate") in the sorting unit by respectively comparing bit values of currently input transferred packed data with those of previously output packed data for every sorting unit. The packed data arrangement changing unit 412 arranges data in the currently input transferred packed data by generating sorted packed data for every sorting unit based on the calculated bit change rate so that the change rate of each bit in the previously output packed data is decreased.

The packed data arrangement changing unit 412 outputs the generated packed data having a low bit change rate as final packed data currently output according to the currently input transferred packed data. The packed data arrangement changing unit 412 adds information on the sorting of data arrangement in the transferred packed data to an unused bit in a packing unit (four transfers) and outputs the information together with the packed data.

The packed data arrangement changing unit 412, as described above, may be configured to sequentially perform sorting for the arrangement of data in the transferred packed data whenever the transferred packed data is input from the packed data generation unit 411. However, the packed data arrangement changing unit 412 may include a memory unit for temporarily storing 32-bit transferred packed data for each burst, i.e., for each packing unit (four transfers). In this case, the packed data arrangement changing unit 412 temporarily stores the transferred packed data input from the packed data generation unit 411 in the memory unit, sorts the arrangement of data in the transferred packed data and then adds sorting information.

Next, the data inverse conversion unit 52 shown in FIG. 2B will be described. In the following description, 1-burst packed data using four transfers as a packing unit, which has been packed by the data conversion unit 41, is input to the data inverse conversion unit 52 via the input DMA unit 56, and the input packed data is restored to Bayer data shown in FIG. 14. Therefore, a description will be given on the assumption that the bit number of each pixel data in the Bayer data is 11 and the memory bus width is 32 bits.

The data inverse conversion unit 52 returns data arranged in each bit of the 32-bit packed data input from the input DMA unit 56 to the original image data (Bayer data) to be processed by the image processing unit 50 using a method reverse to any one of predetermined packing methods which will be described later, to restore 11-bit pixel data. The data inverse conversion unit 52, for example, sequentially outputs the restored original pixel data based on a data enable signal (not shown) input from the image processing unit 50. The data enable signal is a signal indicating a timing at which the pixel data is output to the image processing unit 50.

The packed data arrangement changing unit 521 generates 32-bit packed data (the packed data is identical to that returned to the transferred packed data generated by the packed data generation unit 41, and therefore, referred to as "transferred packed data" in the following description) obtained by returning, to the original arrangement, the arrangement of data in the input 32-bit packed data (the packed data is identical to that generated by the packed data arrangement changing unit 412 in the data conversion unit 41). The packed data arrangement changing unit 521 outputs the respective generated transferred packed data for one burst to the packed data restoring unit 522.

More specifically, the packed data arrangement changing unit 521 generates transferred packed data using a method reverse to the sorting for the arrangement of data in the transferred packed data, performed by the packed data arrangement changing unit 412, based on the sorting information added to the unused bit in the packing unit (four transfers). A bit number identical to the sorting unit in the packed data arrangement changing unit 412 is previously set in the packed data arrangement changing unit 521. The packed data arrangement changing unit 521 generates the transferred packed data obtained by sorting (returning to the original arrangement) the arrangement of data in the packed data for every sorting unit.

The packed data arrangement changing unit 521, as described above, may be configured to sequentially perform sorting for the arrangement of data in the packed data, using a method reverse to the method of sorting the arrangement of data in the transferred packed data, performed by the input DMA unit 56, whenever the packed data is input from the DMA unit 56. However, the packed data arrangement changing unit 521 may include a memory unit for temporarily storing 32-bit packed data (transferred packed data) for each burst, i.e., for each packing unit (four transfers). In this case, the packed data arrangement changing unit 521 temporarily stores the packed data input from the input DMA unit 56 in the memory unit, and performs the sorting for the arrangement of data in the stored packed data.

The packed data restoring unit 522 sequentially divides (unpacks) pixel data arranged in each bit of the transferred packed data input from the packed data arrangement changing unit 521, and restores the divided pixel data to the original pixel data (11-bit pixel data in FIG. 2B). The packed data restoring unit 522 sequentially outputs the restored original pixel data to the image processing unit 50. The recovery method of the transferred packed data to the original pixel data, performed by the packed data restoring unit 522, is identical to that in the conventional packing method in a burst unit, and therefore, its detailed description will be omitted.

Figure 3:
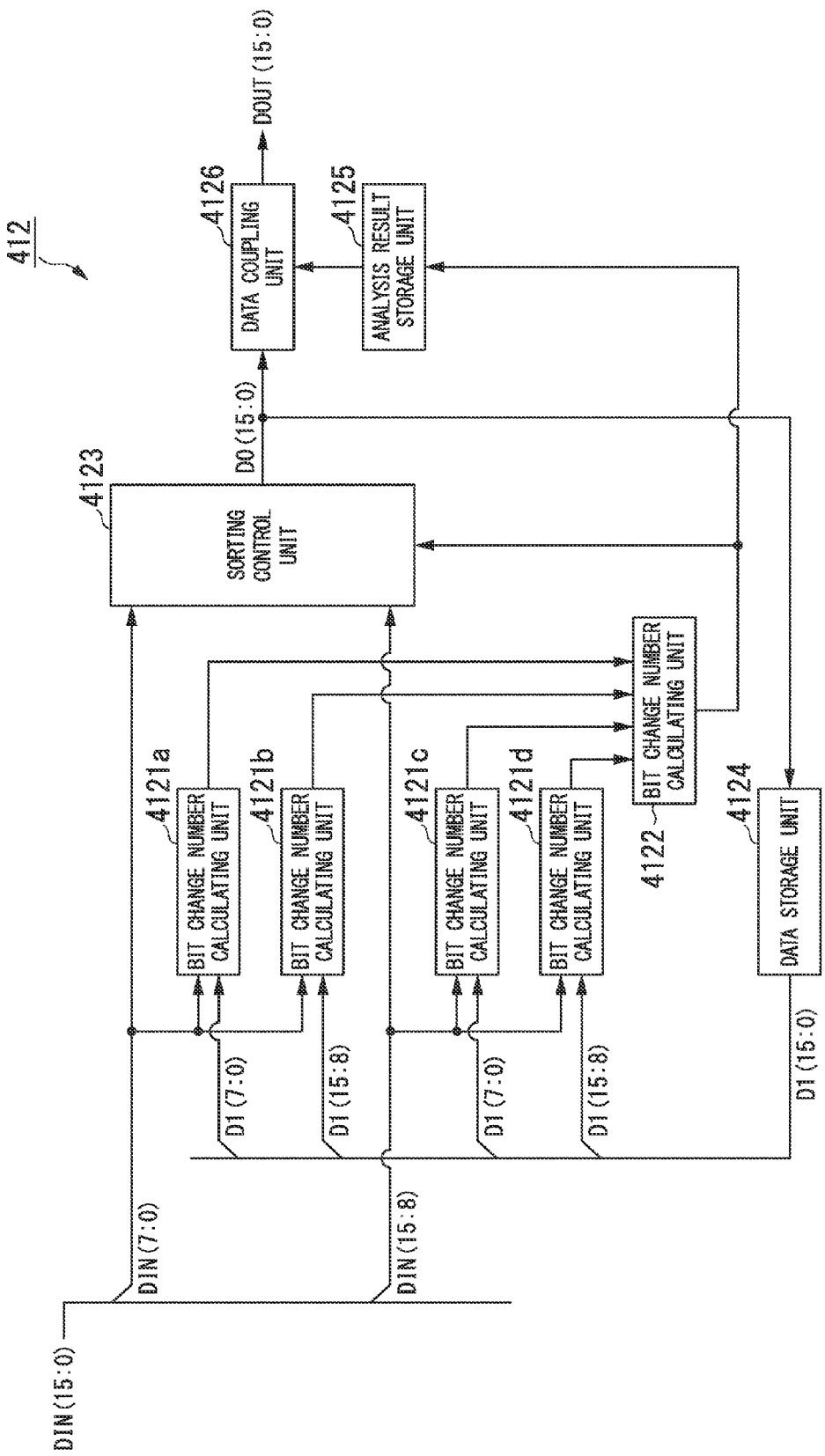
FIG. 3 is a block diagram illustrating a schematic configuration of a packed data arrangement changing unit in the data conversion unit included in the image pickup device in accordance with the first preferred embodiment of the present invention.

Next, the packed data arrangement changing unit 412 included in the data conversion unit 41 will be described in detail. FIG. 3 is a block diagram illustrating a schematic configuration of the packed data arrangement changing unit 412 in the data conversion unit 41 included in the image pickup device 1 in accordance with the first preferred embodiment of the present invention. As shown in FIG. 3, the packed data arrangement changing unit 412 includes four bit change number calculating units 4121a to 4121d (hereinafter, referred to as the "bit change number calculating unit 4121" when indicating any one of the bit change number calculating units 4121a to 4121d), a bit change number analysis unit 4122, a sorting control unit 4123, a data storage unit 4124, an analysis result storage unit 4125 and a data coupling unit 4126.

As described above, the packed data arrangement changing unit 412 changes the arrangement of data in the 32-bit transferred packed data input from the packed data generation unit 411, and generates the 32-bit packed data finally output by the data conversion unit 41. However, for convenience of illustration in the following description, 16-bit transferred packed data is input to the packed data arrangement changing unit 412 from the packed data generation unit 411, and the packed data arrangement changing unit 412 outputs 16-bit packed data obtained by sorting the arrangement of data in the transferred packed data. Therefore, in order to distinguish the 16-bit transferred packed data from the 32-bit transferred packed data, the 16-bit transferred packed data is shown as input data DIN(15:0) in the following description. Also, in order to distinguish the 16-bit packed data from the 32-bit packed data, the 16-bit packed data is shown as output data DOUT(15:0) in the following description. In the following description, when the bit of input or output data is not specified, i.e., when the entire bit range of input or output data is specified, numbers in "( ) parentheses" indicating the bit range of data will be omitted.

In the following description, the 16-bit input data DIN(15:0) is divided into sorting units of 8 upper bits (input data DIN(15:8)) and 8 lower bits (input data DIN(7:0)), and the output data DOUT(15:0) obtained by sorting the arrangement of data in the input data DIN is output as 16-bit output data DOUT(15:0) corresponding to the input data DIN(15:0).

The packed data arrangement changing unit 412 compares the input data DIN for each bit, and generates and outputs output data DOUT having a small bit change. More specifically, the packed data arrangement changing unit 412 calculates a bit change rate of previously output data DOUT and currently input data DIN in units of sorting. The packed data arrangement changing unit 412 generates output data DOUT obtained by sorting the arrangement of data in the currently input data DIN in units of sorting so that the bit change rate for the previously output data DOUT is decreased, based on the respective calculated bit change rates. The packed data arrangement changing unit 412 outputs the output data DOUT having a low change rate for each bit as currently output data DOUT.

The packed data arrangement changing unit 412 adds sorting information when data in the currently input data DIN has been sorted, to any one unused bit of output data in the packing unit and outputs the sorting information.

Each of the bit change number calculating units 4121a to 4121d compares bits of two data input thereto to calculate a change number of the bits (hereinafter referred to as a "bit change number") and outputs the calculated bit change numbers to the bit change number analysis unit 4122. For example, when one data is "0xFF" and the other data is "0x00," the bit change number is output as "8." For example, when one data is "0x00" and the other data is "0x00," the bit change number is output as "0."

In the packed data arrangement changing unit 412 shown in FIG. 3, lower 8-bit input data DIN(7:0) of the input data DIN(15:0) is input as one data of the bit change number calculating unit 4121a, and data D1(7:0) output from the data storage unit 4124 is input as the other data of the bit change number calculating unit 4121a. In the bit change number calculating unit 4121b, the input data DIN(7:0) is input as one data, and data D1(15:8) output from the data storage unit 4124 is input as the other data. In the bit change number calculating unit 4121c, upper 8-bit input data DIN(15:8) of the input data DIN(15:0) is input as one data, and data D1(7:0) is input as the other data. In the bit change number calculating unit 4121d, the input data DIN(15:8) is input as one data, and data D1(15:8) is input as the other data. Each of the bit change number calculating units 4121a to 4121d calculates a bit change number by comparing bits of the input data DIN input as one data with bits of the data D1 input as the other data.

The bit change number analysis unit 4122 determines whether or not to perform a process of sorting the arrangement of data in the input data DIN (hereinafter referred to as a "sorting process"), based on the bit change numbers respectively input from the bit change number calculating units 4121a to 4121d, and outputs determination result information to the sorting control unit 4123 and the analysis result storage unit 4125.

More specifically, the bit change number analysis unit 4122 extracts a small bit change number by analyzing the bit change numbers respectively input from the bit change number calculating units 4121a to 4121d. The bit change number analysis unit 4122 determines whether or not to perform the sorting process for sorting the upper 8-bit input data DIN(15:8) and the lower 8-bit input data DIN(7:0) in the input data DIN(15:0) based on data input to the bit change number calculating unit 4121 outputting the extracted small bit change number.

The bit change number analysis unit 4122 determines whether or not to perform the sorting process in consideration of the entire output data DOUT so that a rate of the bit change (bit change number) of the currently output data DOUT to the previously output data DOUT is lowest.

The bit change number analysis unit 4122 outputs determination result information to the sorting control unit 4123 and the analysis result storage unit 4125. In order to output one determination result for the input data DIN, the packed data arrangement changing unit 412 shown in FIG. 3, for example, outputs "0" as the determination result information when the sorting process is not performed, and outputs "1" as the determination result information when the sorting process is performed.

The "0" as the determination result information means that the input data DIN is output as the output data DOUT without performing the sorting process for the input data DIN. The "1" as the determination result information means that the data obtained by performing the sorting process for sorting the upper 8 bits and the lower 8 bits in the input data DIN is output as the output data DOUT.

The sorting control unit 4123 performs a sorting process of the input data DIN based on the determination result information input from the bit change number analysis unit 4122. The sorting control unit 4123 outputs data D0(15:0) obtained by performing the sorting process to the data storage unit 4124 and the data coupling unit 4126. More specifically, when the determination result information input from the bit change number analysis unit 4122 is "0," i.e., when the sorting process is not performed on the input data DIN, the sorting control unit 4123 outputs the input data DIN(15:0) as the data D0(15:0).

When the determination result information on the sorting process input from the bit change number analysis unit 4122 is "1," i.e., when the sorting process is performed on the input data DIN, the sorting control unit 4123 outputs, as the data D0(15:0), data (input data DIN(7:0) and input data DIN(15:8)) obtained by sorting the upper 8-bit input data DIN(15:8) and the lower 8-bit input data DIN(7:0) in the input input data DIN(15:0).

The data storage unit 4124 stores the data D0(15:0) output from the sorting control unit 4123. The D0 stored by the data storage unit 4124 is previously output data DOUT, and the bit change number calculation unit 4121 uses the D0 to calculate a bit change number between the D0 and subsequently input input data DIN. The data storage unit 4124 outputs the stored D0 as the other data D1 of the bit change number calculating unit 4121 to each of the bit change number calculating units 4121a and 4121d. Accordingly, the bit change number calculating unit 4121 calculates a bit change number between the output data DOUT obtained by performing the sorting process of the input data DIN and the subsequently input input data DIN.

The analysis result storage unit 4125 stores the determination result information on the sorting process input from the bit change number analysis unit 4122, i.e., the "0" or "1" output by the bit change number analysis unit 4122. The determination result information stored by the analysis result storage unit 4125 is used as information on whether or not the currently output data DOUT is data obtained by performing the sorting process of the input data DIN. The analysis result storage unit 4125 outputs the stored determination result information to the data coupling unit 4126.

The bit change number analysis unit 4122 outputs one determination result for the input data DIN(15:0). Thus, in the data conversion unit 41 included in the image pickup device 1 shown in FIG. 2A, 32-bit transferred packed data is input from the packed data generation unit 411, and hence two determination results are obtained. Accordingly, the analysis result storage unit 4125 has a storage capacity capable of storing information of two determination results.

The data coupling unit 4126 sequentially outputs the sort-processed data D0(15:0) input from the sorting control unit 4123. In this case, the data coupling unit 4126 adds (couples) the determination result information input from the analysis result storage unit 4125 to an unused bit in the packing unit, i.e., in any one of the data D0 input from the sorting control unit 4123, and generates output data DOUT finally output by the data conversion unit 41. The method in which the data coupling unit 4126 couples the determination result information to the unused bit will be described in detail later.

Here, the method in which the packed data arrangement changing unit 412 generates packed data obtained by sorting the arrangement of data will be described. FIGS. 4A, 4B, 4C, 4D and 4E are diagrams illustrating a method of generating packed data in the packed data arrangement changing unit 412 of the data conversion unit 41 included in the image pickup device 1 in accordance with the first preferred embodiment of the present invention. In the following description, the arrangement of data in the input data DIN according to the entire sequence when the packed data arrangement changing unit 412 generates the sorted output data DOUT will be described with reference to the configuration of the packed data arrangement changing unit 412 shown in FIG. 3. The sorting unit in the packed data arrangement changing unit 412 shown in FIG. 3 is 8 bits.

Figure 4:
FIGS. 4A, 4B, 4C, 4D and 4E are diagrams illustrating a method of generating packed data in the packed data arrangement changing unit of the data conversion unit included in the image pickup device in accordance with the first preferred embodiment of the present invention.

Input data DIN(15:0) for 1 burst i.e., for a packing unit (4 transfers), is sequentially input to the packed data arrangement changing unit 412 from the packed data generation unit 411. Here, a case in which input data DIN for 4 transfers, i.e., first, second, third and fourth transfers, is sequentially input as shown in FIG. 4 will be described. As shown in FIG. 4A, there is an unused bit in the input data DIN for the fourth transfer in the input data DIN(15:0) for the packing unit (4 transfers). In the following description, the packed data arrangement changing unit 412 adds (couples) the determination result information to the unused bit of the output data DOUT for the fourth transfer.

First, the operation of the data conversion unit 41 is started, and the packed data generation unit 411 sequentially inputs input data DIN(15:0). If input data DIN ("0xFF5A") for the first transfer is input to the packed data arrangement changing unit 412 from the packed data generation unit 411, the packed data arrangement changing unit 412 starts generating output data DOUT for the first transfer according to the input data DIN for the first transfer. The input data DIN in the first transfer is input data DIN that becomes a reference in current burst transfer. For this reason, when the packed data arrangement changing unit 412 generates the output data DOUT for the first transfer, the sorting control unit 4123 does not perform a sorting process of the input data DIN for the first transfer.

In the generation of the output data DOUT for the first transfer, the bit change number calculating unit 4121 outputs "0" as the bit change number for the first transfer, and the bit change number analysis unit 4122 "0" as the determination result information for the first transfer. Accordingly, the sorting control unit 4123 outputs the input data DIN for the first transfer as data D0(15:0) for the first transfer. The data storage unit 4124 stores the data D0 for the first transfer output from the sorting control unit 4123, and outputs the stored data D0 for the first transfer as data D1 for the first transfer. The data coupling unit 4126 outputs the data D0 for the first transfer input from the sorting control unit 4123 as output data DOUT (15:0) for the first transfer.

The analysis result storage unit 4125 does not store the determination result information for the first transfer output from the bit change number analysis unit 4122. The data coupling unit 4126 does not perform the addition (coupling) of the determination result information on the output data DOUT for the first transfer.

Next, if input data DIN ("0x5AFE") for the second transfer is input to the packed data arrangement changing unit 412 from the packed data generation unit 411, the packed data arrangement changing unit 412 starts generating output data DOUT for the second transfer according to the input data DIN for the second transfer. In the generation of the output data DOUT for the second transfer, the bit change number calculating unit 4121 calculates a bit change number by respectively comparing bits of the input data DIN for the second transfer with bits of the data D1 for the first transfer input from the data storage unit 4124, i.e., the output data DOUT for the first transfer.

More specifically, the bit change number calculating unit 4121a calculates a bit change number between the lower input data DIN(7:0) for the second transfer and the lower data D1(7:0) for the first transfer. The bit change number calculating unit 4121b calculates a bit change number between the lower input data DIN(7:0) for the second transfer and the upper data D1(15:8) for the first transfer. The bit change number calculating unit 4121c calculates a bit change number between the upper input data DIN(15:8) for the second transfer and the lower data D1(7:0) for the first transfer. The bit change number calculating unit 4121d calculates a bit change number between the upper input data DIN(15:8) for the second transfer and the upper data D1(15:8) for the first transfer. Each of the bit change number calculating units 4121a to 4121d outputs the calculated bit change number to the bit change number analysis unit 4122.

Here, the method in which the bit change number calculating unit 4121 calculates a bit change number will be described with reference to FIG. 4B. In an upper portion of FIG. 4B, the values of bits of the lower data D1(7:0) for the first transfer, i.e., the lower input data DIN(7:0) for the first transfer, shown in FIG. 4A, are respectively compared with those of the lower input data DIN(7:0) for the second transfer, shown in FIG. 4A. In the lower portion of FIG. 4B, the values of bits of the upper data D1(15:8) for the first transfer, i.e., the upper input data DIN(15:8) for the first transfer, shown in FIG. 4A, are respectively compared with those of the upper input data DIN(15:8) for the second transfer, shown in FIG. 4A.

As can be seen from the upper portion of FIG. 4B, when comparing the value ("0x5A"="0101_1010") of the lower input data DIN(7:0) for the first transfer with the value ("0xFE"="1111_1110") of the lower input data DIN(7:0) for the second transfer, the values of 3 bits the input data DIN(7), the input data DIN(5) and the input data DIN(2). That is, the output data DOUT(7:0) is changed from "0x5A" to "0xFE", so that 3 bits are changed. In this case, the bit change number calculating unit 4121 outputs "3" as the bit change number.

As can be seen from the lower portion of FIG. 4B, when comparing the value ("0xFF"="1111_1111") of the upper input data DIN(15:8) for the first transfer with the value ("0x5A"="0101_1010") of the upper input data DIN(15:8) for the second transfer, the values of 4 bits of the input data DIN(15), the input data DIN(13), the input data DIN(10) and the input data DIN(8). That is, the output data DOUT(15:8) is changed from "0xFF" to "0x5A," so that 4 bits are changed. In this case, the bit change number calculating unit 4121 outputs "4" as the bit change number.

Then, the bit change number analysis unit 4122 determines whether or not to perform a sorting process of the input data DIN for the second transfer, based on the value of the bit change number input from the bit change number calculating unit 4121. For example, as shown in FIG. 4C, a case in which the value ("0x5A") of the upper 8-bit input data DIN(15:8) in the input data DIN(15:0) for the second transfer and the value ("0xFE") of the lower 8-bit input data DIN(7:0) are sorted will be described. In this case, if bit change numbers are calculated as described in the comparison of bits shown in FIG. 4B, each of the bit change numbers is changed.

More specifically, since the value of the lower output data DOUT(7:0) is changed from "0x5A" to "0x5A," the bit change number becomes "0." Since the value of the upper-level output data DOUT(15:8) is changed from "0xFF" to "0xFF," the bit change number becomes "1." Thus, it can be seen that the data sorted into the upper 8 bits and the lower 8 bits of the input data DIN(15:0) for the second transfer has a small bit change rate of the output data DOUT for the second transfer. Accordingly, the bit change number analysis unit 4122 determines to perform the sorting process of the input data DIN for the second transfer. The bit change number analysis unit 4122 outputs "1," which is determination result information that the sorting process has been determined to be performed, as the determination result information for the second transfer. The analysis result storage unit 4125 stores the determination result information for the second transfer output from the bit change number analysis unit 4122.

The bit change number analysis unit 4122 does not determines whether or not to perform the sorting process for each sorting unit, but determines whether or not to perform the sorting process in consideration of the entire output data DOUT, for example, so that the bit change rate (bit change number) of the output data DOUT is lowest when changed from the output data DOUT for the first transfer to the output data DOUT for the second transfer.

More specifically, for example, a case in which input data DIN ("0xFF5A") for the first transfer is input and input data DIN ("0x115A") for the second transfer is consecutively input will be described. When the sorting process is not performed, the lower output data (7:0) is changed from "0xFF" to "0x11," and hence the bit change number becomes "6." The upper output data DOUT(15:8) is changed from "0x5A" to "0x5A," and hence the bit change number becomes "0." That is, the bit change number in the entire output data DOUT becomes "6." Meanwhile, when the sorting process is performed, the lower output data DOUT(7:0) is changed from "0xFF" to "0x5A," and hence the bit change number becomes "4." The upper output data DOUT(15:8) is changed from "0x5A" to "0x11," and hence the bit change number becomes "4." As such, when the sorting process is performed, the bit change number of the lower output data DOUT(15:8) is decreased, but the bit change number of the upper output data DOUT(15:8) is increased. Therefore, the bit change number of the entire output data DOUT becomes "8."

Thus, the bit change number analysis unit determines not to perform the sorting process of the input data DIN for the second transfer. The bit change number analysis unit 4122 outputs "0," which is determination result information that the sorting process has been determined not to be performed, as the determination result information for the second transfer.

Then, the sorting control unit 4123 performs a sorting process of the input data DIN for the second transfer based on the determination result information ("1") or the second transfer input from the bit change number analysis unit 4122, and outputs the sorted input data DIN for the second transfer as data D0(15:0) for the second transfer. The data storage unit 4124 stores the data D0 for the second transfer output from the sorting control unit 4123, and outputs the stored data D0 for the second transfer as data D1 for the second transfer. The data coupling unit 4126 outputs the data D0 for the second transfer input from the sorting control unit 4123 as output data(15:0) for the second transfer. The data coupling unit 4126 does not perform the addition (coupling) of the determination result information on the output data DOUT for the second transfer.

Next, the packed data arrangement changing unit 412 generates and outputs output data DOUT for the third transfer according to input data DIN("0xFC5B") for the third transfer, input from the packed data generation unit 411. When generating the output data DOUT for the third transfer, the packed data arrangement changing unit 412 generates the output data DOUT for the third transfer based on the data D1, i.e., the output data DOUT for the second transfer and the input data DIN for the third transfer. The data coupling unit 4126 does not perform the addition (coupling) of the determination result information on the output data DOUT for the third transfer.

Then, if input data DIN("0x**FB": "*" indicates an unused bit) for the fourth transfer is input to the packed data arrangement changing unit 412 from the packed data generation unit 411, the packed data arrangement changing unit 412 starts generating output data DOUT for the fourth transfer according to input data DIN for the fourth transfer. Determination result information on the sorting process in current burst transfer is added (coupled) to an unused bit of the input data for the fourth transfer. For this reason, when generating the output data DOUT for the fourth transfer, the packed data arrangement changing unit 412 does not perform the sorting process of a sorting unit containing the unused bit. Accordingly, the position of each bit in the output data DOUT adding the determination result information on the sorting process can be fixed.

More specifically, in the input data DIN shown in FIG. 4A, all bits of the upper input data DIN(15:8) for the fourth transfer are unused bits. The sorting unit for performing the sorting process of the upper input data DIN(15:8) is lower input data DIN(7:0). For this reason, the position of each bit of the upper input data DIN(15:8) for the fourth transfer is fixed as that of each bit of the data for adding the determination result information on the sorting process. Thus, in the example shown in FIG. 4, the sorting control unit 4123 does not perform the sorting process of the input data DIN for the fourth transfer.

In the generation of the output data DOUT for the fourth transfer, the bit change number calculating unit 4121 outputs "0" as the value of the bit change number for the fourth transfer, and the bit change number analysis unit 4122 outputs "0" as the determination result information for the fourth transfer. The sorting control unit 4123 outputs the input data DIN for the fourth transfer as data D0(15:0) for the fourth transfer. Accordingly, the position of each bit of the data for adding the determination result information on the sorting process is fixed as the data D0(15:8) for the fourth transfer.

As such, the sorting process of the input data DIN(15:0) for a packing unit (4 transfers), i.e., 1 burst, input from the packed data generation unit 411, is sequentially performed. FIG. 4D shows data D0 for four transfers before/after the sorting process is performed. The left side of FIG. 4D shows data D0 when the input data DIN for the four transfers shown in FIG. 4A is output as is without performing the sorting process. The right side of the FIG. 4D shows data D0 after the sorting process is performed.

In the input data DIN for the four transfers shown in FIG. 4A, as shown in the right side of FIG. 4D, the sorting process is performed when the data D0 is changed from data D0 for the first transfer to data D0 for the second transfer, and is not performed when the data D0 is changed from the second data D0 for the second transfer to data for the third transfer. As described above, the sorting process is not performed when the data D0 is changed from the data D0 for the third transfer to data D0 for the fourth data transfer.

When the data D0 for the fourth transfer input from the sorting control unit 4123 is output as output data DOUT(15:0) for the fourth transfer, the data coupling unit 4126 sequentially adds (couples) the determination result information in the transfers stored in the analysis result storage unit 4125 to unused bits of the output data DOUT(15:0) for the fourth transfer.

More specifically, as shown in FIG. 4E, the data coupling unit 4126 adds (couples) the determination result information ("1") on the output data DOUT for the second transfer stored in the analysis result storage unit 4125 to the unused bit of the data D0(8) for the fourth transfer, and adds (couples) the determination result information ("0") on the output data DOUT for the third transfer stored in the analysis result storage unit 4125 to the unused bit of the data D0(0) for the fourth transfer. The data coupling unit 4126 outputs the data D0 for the fourth transfer to which the determination result information is bit-coupled as the finally output data DOUT.

As such, the packed data arrangement changing unit 412 generates the output data DOUT obtained by sorting the data arrangement for each sorting unit according to each bit of the input data DIN. Thus, the change rate of the output data DOUT (packed data) for each bit can be decreased between transfers in the burst transfer. Accordingly, in the data conversion unit 41, it is possible to maintain the same transfer efficiency of image data as the conventional packing method in a burst unit and to reduce power consumption related to the transfer of image data as compared with the conventional packing method in a burst unit.

In the packed data arrangement changing unit 412 shown in FIG. 3, a case in which the packed data arrangement changing unit 412 divides 16-bit input data DIN into sorting units of 8 upper bits and 8 lower bits and outputs 16-bit output data DOUT obtained by sorting the arrangement of data in the input data DIN has been described. The position of a bit to which the determination result information on the sorting process is added is fixed as the output data DOUT(15:8) for the fourth transfer, which is final packed data, and the sorting process of the input data DIN for the fourth transfer is not performed.

However, in the sorting unit containing the unused bit and other corresponding sorting units, the sorting process can be performed even on the final packed data in the burst transfer between the other sorting units according to the sorting unit containing the unused bit. For example, when the number of bits in the input data DIN is large (e.g., when the packed data is 32 bits) or when the sorting process is performed for a sorting unit other than the sorting unit having a small bit number in the sorting unit (e.g., the bit number for the sorting unit is 4 bits) and containing an unused bit and the sorting unit corresponding thereto (e.g., when a bit number for a sorting unit is generated between packed data (3:0) and packed data (7:4)), the determination result information on the sorting process can be added by performing the sorting process for the sorting unit. The sorting process for a sorting unit other than the sorting unit containing the unused bit is identical to that described above, and therefore, its detailed description will be omitted.

Figure 5:
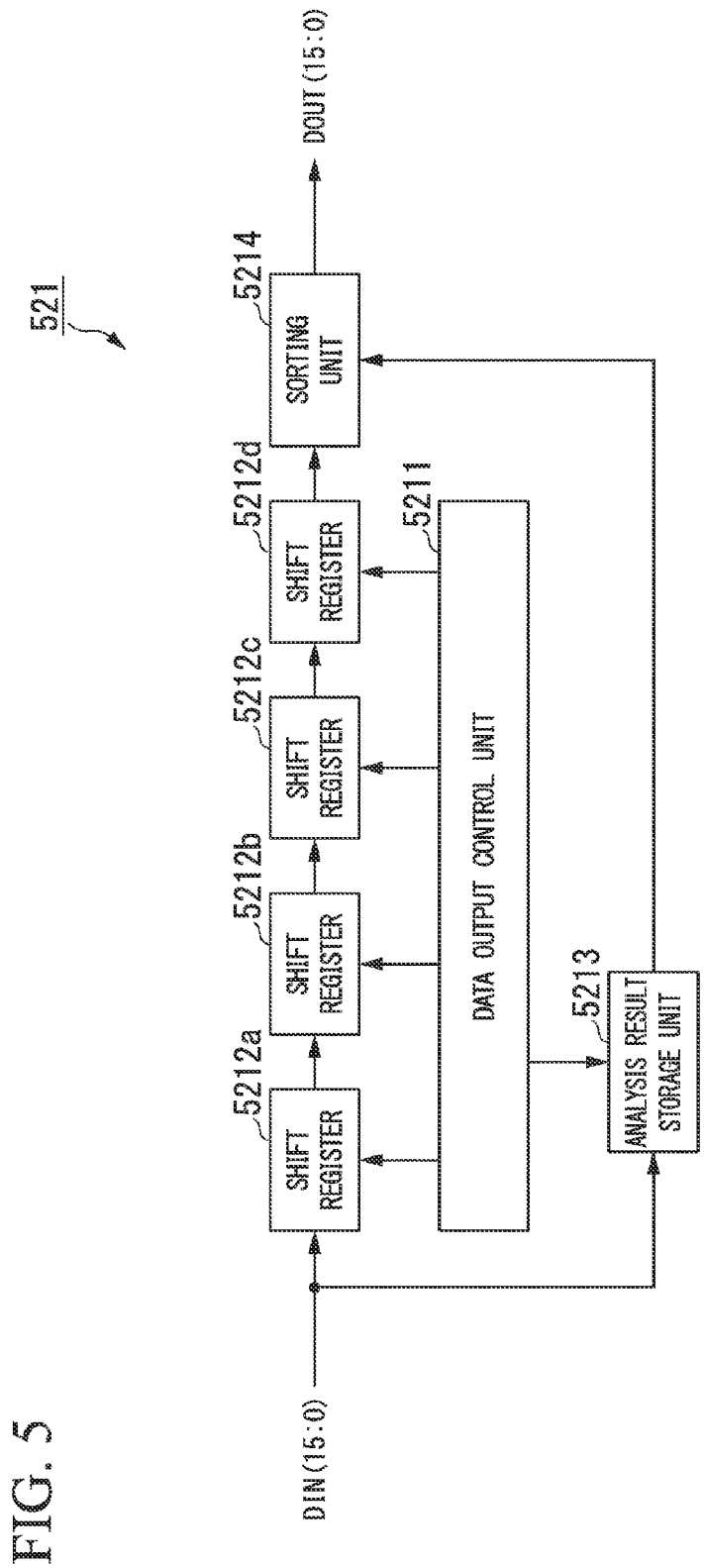
FIG. 5 is a block diagram illustrating a schematic configuration of the packed data arrangement changing unit in the data inverse conversion unit included in the image pickup device in accordance with the first preferred embodiment of the present invention.

Next, the data arrangement changing unit 521 included in the data inverse conversion unit 52 will be described in detail. FIG. 5 is a block diagram illustrating a schematic configuration of the packed data arrangement changing unit 521 in the data inverse conversion unit 52 included in the image pickup device 1. As shown in FIG. 5, the packed data arrangement changing unit 521 includes a data output control unit 5211, four shift registers 5212a to 5212d (hereinafter, any one of the shift registers 5212a to 5212d is referred to as the "shift register 5212"), an analysis result storage unit 5213 and the sorting unit 5214.

As described above, the packed data arrangement changing unit 521 changes (returns to the original arrangement) the arrangement of data in 32-bit packed data input from the input DMA unit 56, and generates 32-bit packed data identical to the transferred packed data generated by the packed data generation unit 41 in the data conversion unit 41. The packed data arrangement changing unit 512 outputs the generated transferred packed data to the packed data restoring unit 522. However, for convenience of illustrating in the following description, a case in which the packed data arrangement changing unit 521 receives 16-bit packed data input from the input DMA unit 56 and outputs 16-bit transferred packed data obtained by sorting the arrangement of data in the packed data will be described. Thus, in the following description, the 16-bit packed data is shown as input data DIN(15:0) in order to distinguish the 16-bit packed data from the 32-bit packed data. In the following description, the 16-bit transferred packed data is shown as output data DOUT(15:0) in order to distinguish the 16-bit transferred packed data from the 32-bit transferred packed data. In the following description, when bits of input or output data are not specified, i.e., when the range of all bits of the input or output data is shown, numbers in "( ) parentheses" indicating the range of bits of data will be omitted.

In the following description, a case in which input data DIN for one burst (four transfers) using four transfers as a packing unit packed by the data conversion unit 41 as shown in FIG. 4E is sequentially input in an order of first, second, third and fourth transfers so as to output the output data DOUT for four transfers as shown in FIG. 4A will be described.

A sorting unit having a bit number identical to that of the sorting unit in the packed data arrangement changing unit 412 included in the data conversion unit 41 is previously set in the packed data arrangement changing unit 521. Also, transfer sorting information (determination result information of a sorting process) contained in the input data DIN which is added (coupled) to a bit, i.e., the position of a bit indicating the determination result information on the sorting process is previously set in the packed data arrangement changing unit 521. The packed data arrangement changing unit 521 generates transferred packed data obtained by returning the arrangement of data in the input data DIN to the original arrangement for every sorting unit based on the determination result information on the sorting process contained in the input input data DIN.

More specifically, an 8-bit sorting unit is previously set in the packed data arrangement changing unit 521 shown in FIG. 5. The determination result information on input data DIN for the second transfer added to a bit (8) of input data DIN for the fourth transfer, and the determination result information on input data DIN for the third transfer added to a bit (9) of the input data DIN for the fourth transfer, are previously set in the packed data arrangement changing unit 521. The packed data arrangement changing unit 521 divides the 16-bit input data DIN(15:0) into a sorting unit of 8 upper bits (input data DIN(15:8)) and 8 lower bits (input data DIN(7:0)), and outputs the output data DOUT(15:0) obtained by sorting (returning) the arrangement in data in the input data DIN to the original arrangement as 16-bit output data (15:0) corresponding to the input data DIN(15:0).

The shift registers 5212a to 5212d are registers are registers for sequentially storing the input data DIN input to the packed data arrangement changing unit 521. Whenever the input data DIN is input, each of the shift registers 5212a to 5212d shifts data stored in the subsequent shift register 5212 and simultaneously stores the input data. The data shifted in the last shift register 5212d is output to the sorting unit 5214.

More specifically, for example, input data DIN for the first transfer is first input and stored in the shift register 5212a. Whenever input data DIN after the second transfer is input to the shift register 5212a, the input data DIN for the first transfer stored in the shift register 5212a is sequentially input to the subsequent shift register 5212 in an order of the shift register 5212a→the shift register 5212b→the shift register 5212c→the shift register 5212d. The input data DIN for the first transfer is shifted to the shift register 5212d and then output to the sorting unit 5214. As such, the shift register 5212 stores all input data DIN for one burst (four transfers) while shifting the input data DIN input to the packed data arrangement changing unit 521.

The input data DIN stored in the shift register 5212 is again shifted under a shift command input from the data output control unit 5211, and the shifted input data DIN is sequentially output to the sorting unit 5214.

As described above, the shift register 5212 stores all the input data for one burst. That is, the shift register 5212 stores all the input data for a packing unit. Accordingly, shift registers 5212 formed to corresponding to the packing unit in number are included in the packed data arrangement changing unit 521.

The analysis result storage unit 5213 stores the determination result information on the sorting process contained in the input data DIN input to the packed data arrangement changing unit 521, e.g., the determination result information ("0") indicating that the sorting process is not performed or the determination result information ("1") indicating that the sorting process of sorting the lower 8 bits and the upper 8 bits is performed. The determination result information stored by the analysis result storage unit 5213 is used as information indicating whether or not the sorting process is performed on currently input data DIN. The determination result information stored in the analysis result storage unit 5213 is output to the sorting unit 5214 under an output command input from the data output control unit 5211.

The determination result information provides one piece of determination result information for the input data DIN(15:0). Thus, in the data inverse conversion unit 52 included in the image pickup device 1 in accordance with the first preferred embodiment of the present invention shown in FIG. 2B, 32-bit packed data is input, and hence, two pieces of determination result information are provided for every 16 bits with respect to one packed data. Accordingly, the analysis result storage unit 5213 has a storage capacity capable of storing the information of two determination results.

The data output control unit 5211 controls a shift of the input data DIN stored in the shift register 5212, and controls the output of the determination result information, stored in the analysis result storage unit 5213. After all the input data DIN for one burst (four transfers) stored in the packed data arrangement changing unit 521 is stored in each of the shift registers 5212, the data output control unit 5211 outputs a shift command for shifting the input data DIN stored in the shift register 5212 to each of the shift registers 5212. Accordingly, the input data DIN stored in the shift registers 5212 is sequentially shifted and output to the sorting unit 5214. In the packed data arrangement changing unit 521 shown in FIG. 5, all the input data DIN for one burst (four transfers) is stored in each of the shift registers 5212 and four-time shift commands are output to the respective shift registers 5212 so as to sequentially output all the input data DIN stored in the respective shift registers 5212 to the sorting unit 5214.

The data output control unit 5211 outputs an output command for outputting corresponding determination result information to the analysis result storage unit 5213, in synchronization with the shift of the input data DIN stored in the shift register 5212. In the packed data arrangement changing unit 521 shown in FIG. 5, the data output control unit 5211 outputs the output command to the analysis result storage unit 5213 at the timing at which the input data DIN for the second and third transfers are input to the sorting unit 5214. Accordingly, the determination result information corresponding to the input data DIN input to the sorting unit 5214 (information indicating whether or not the sorting process is performed on the input data DIN) is output to the sorting unit 5214.

The sorting unit 5214 performs a sorting process of the input data DIN input from the shift register 5212d based on the determination result information input from the analysis result storage unit 5213. Then, the sorting unit 5214 outputs the output data DOUT(15:0) obtained after the sorting process as an output from the packed data arrangement changing unit 521. More specifically, when the determination result information input from the analysis result storage unit 5213 is "0," i.e., when the sorting process of the input data DIN is not performed, the sorting unit 5214 outputs the input data DIN (15:0) input from the shift register 5212d as the output data DOUT(15:0).

When the determination result information input from the analysis result storage unit 5213 is "1," i.e., when the sorting process of the input data DIN is performed, the sorting unit 5214 outputs, as the output data DOUT(15:0), data (input data DIN(7:0) and input data DIN(15:8) obtained by sorting the upper 8-bit input data DIN(15:8) and the lower 8-bit input data DIN(7:0) in the input data DIN(15:0) input from the shift register 5212d.

When the determination result information is not input from the analysis result storage unit 5213, the sorting unit 5214 does not perform the sorting process of the input data DIN but outputs the input data DIN(15:0) input from the shift register 5212d as the output data DOUT(15:0). For example, as shown in FIG. 4E, the sorting unit 5214 does not perform the sorting process of the packed input data DIN for the first and fourth transfers. Thus, when the input data DIN for the first and fourth transfers is input to the sorting unit 5214 from the shift register 5212d, the corresponding determination result information is not input from the analysis result storage unit 5213. For this reason, the sorting unit 5214 does not perform the sorting process of the input data DIN input from the shift register 5212d but outputs the input data DIN as the output data DOUT.

Next, a method of arranging (packing) pixel data will be described. In the image pickup device 1, the data conversion units 41 and 51 generate packed data obtained by arranging input pixel data in the memory bus, and the data inverse conversion units 52 and 62 restore the input packed data to the original pixel data. In the following description, a case in which pixel data in the Bayer data shown in FIG. 14 is sequentially input to the data conversion unit 41, and four transfers are packed as packed data for one burst set as one packing unit will be described. Therefore, a description will be given on the assumption that that the bit number of each pixel data in the Bayer data is 11 and the memory bus width is 32 bits. In the Bayer data shown in FIG. 14, the number of each pixel data indicates a pixel position in CCD30, and "R," "G" or "B" prior to the number indicates a pixel color in CCD30. More specifically, "R" indicates pixel data of a red pixel in CCD30, "G" indicates pixel data of a green pixel in CCD 30, and "B" indicates pixel data of a blue pixel in CCD 30.

The method in which the data inverse conversion units 52 and 62 restore the packed data to the original pixel data is a method reverse to the method in which the data conversion units 41 and 51 pack the pixel data, and therefore, its detailed description will be omitted.

In the following description, a case in which 8 bits (1 byte) is set as a sorting unit in the packed data arrangement changing unit 412 included in the data conversion unit 41, and the packed data arrangement changing unit 412 outputs the arrangement of data of input 32-bit transferred packed data (31:0), i.e., packed data (31:0) sorted for every 1-byte sorting unit, will be described.

When the number of combinations obtained by sorting 32-bit (4 bytes) transferred packed data for every one byte is 24. The packed data arrangement changing unit 412 determines, from the 24 combinations, the arrangement of pixel data in the transferred packed data having the lowest rate of bit change (bit change number) of the packed data output on the memory bus, and outputs the packed data obtained by performing the sorting process. However, the bit number for indicating 24 kinds of sorting information (the determination result information on the sorting process) obtained by sorting the arrangement of pixel data in the transferred packed data is 5 bits. The 5-bit determination result information corresponds to each packed data, and hence, the bit number indicating the determination result information on all packed data becomes "5 bits×number of packed data." If the determination result information on all the packed data is added to an unused bit in the packed data, the rate of bits in the packed data used for the determination result information is increased, and the burst transfer efficiency is lowered. Further, the scale of a circuit for determining the arrangement of pixel data in the transferred packed data is increased. For this reason, it is not effective to add the combinations for arranging all the pixel data in the transferred packed data to the unused bit in the packed data as the determination result information.

Figure 6:
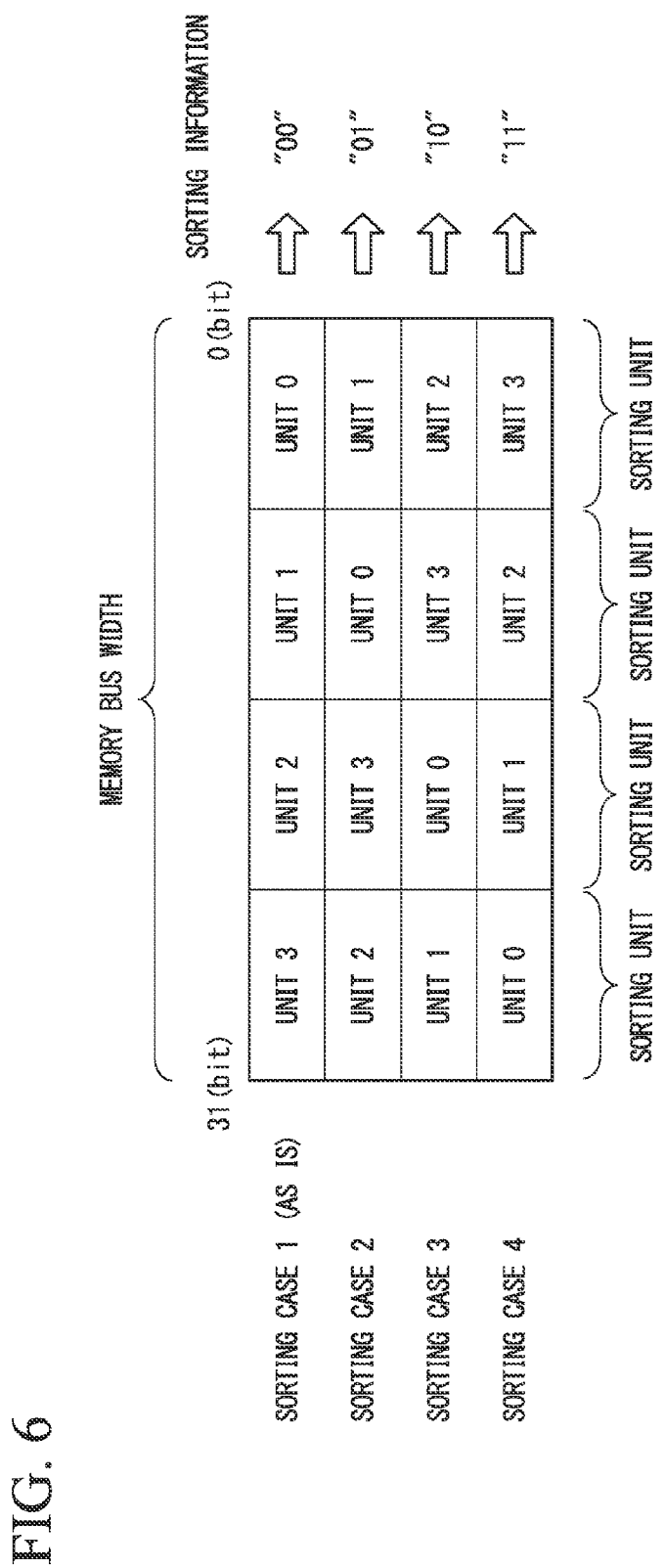
FIG. 6 is a diagram illustrating an example of the combination of sorting information in the packed data arrangement changing unit of the data conversion unit included in the image pickup device in accordance with the first preferred embodiment of the present invention.

Accordingly, as shown in FIG. 6, the packed data arrangement changing unit 412 determines, for example, the arrangement of pixel data in the transferred packed data having the lowest rate of bit change (bit change number) of the packed data in the range of a predetermined combination. FIG. 6 is a diagram illustrating an example of the combination of sorting information in the packed data arrangement changing unit 412 of the data conversion unit 41 included in the image pickup device 1 in accordance with the first preferred embodiment of the present invention. As shown in FIG. 6, in the packed data arrangement changing unit 412, four sorting cases (sorting cases 1 to 4) are previously set, and the arrangement of pixel data in the transferred packed data for a sorting unit is set for each of the sorting cases. Also, the value of sorting information corresponding to each of the sorting cases is set. In the table shown in FIG. 6, the number attached to "unit" is information for identifying a sorting unit provided for convenience of illustration. The number is a number sequentially provided from a lower sorting unit (byte) in the case (sorting case 1) in which the sorting process of the input transferred packed data is not performed. The number is information for identifying to which position of a sorting unit the arrangement of pixel data is sorted through the sorting process.

The method of decreasing the bit number used in the sorting information is effective because desired sorting information can be added even when the bit number of the unused bit contained in the transferred packed data is small.

Data Arrangement Method

FIGS. 7A and 7B are diagrams illustrating an example of the packed data arranged by the data conversion unit 41 included in the image pickup device 1 in accordance with the first preferred embodiment of the present invention. FIG. 7A shows transferred packed data generated by the conventional method of arranging (packing) data for one burst, i.e., transferred packed data in which bits of pixel data are arranged by the packed data generation unit 411. FIG. 7B shows the arrangement of data in the packed data, in which the arrangement of pixel data in the transferred packed data is changed by the method of arranging (packing) data in accordance with the first preferred embodiment of the present invention.

In the packing method in accordance with the first preferred embodiment of the present invention, the packed data arrangement changing unit 412 compares each bit data of the pixel data in the transferred packed data for every predetermined sorting unit (one byte), and generates packed data obtained by sorting the arrangement of pixel data in the transferred packed data in the range of a predetermined combination.

First, the packed data generation unit 411 generates transferred packed data obtained by packing each pixel data ("R0," "G1," "R2," "G3," "R4," "G5," "R6," "G7," "R8," "G9" and "R10") in the Bayer data. More specifically, as shown in FIG. 7A, the packed data generation unit 411 sequentially arranges (packs) bits (0 to 9) of "R0," "G1" and "R2" for a first transfer, a bit (10) of "R2" and bits (0 to 8) of "G3," "R4" and "G5" for a second transfer, bits (9 and 10) of "G5" and bits (0 to 7) of "R6," "G7" and "R8" for a third transfer, and bits (8 to 10) of "R8," "G9" and "R10" for a fourth transfer, from the lowermost bit of the memory bus.

When not all bits of the pixel data for the packing unit are arranged, the packed data generation unit 411 does not pack next pixel data (e.g., pixel data "G11" in the Bayer data). This is because the data conversion unit 41 packs each pixel data for the packing unit. If the data conversion unit 41 packs a part of the pixel data "G11," the pixel data "G11" exceeds the packing unit. Therefore, the packed data generation unit 411 sets, as unused bits, bits (in FIG. 7, bits (25) to (31) of the transferred packed data for the fourth transfer are set as unused bits) of the transferred packed data in the packing unit in which the pixel data is not arranged. The packed data arrangement changing unit 412 adds (couples), to the unused bits, sorting information obtained by sorting the arrangement of pixel data in each of the transferred packed data.

Next, the packed data arrangement changing unit 412 compares each bit of the currently input transferred packed data with each bit of the previously output packed data, and calculates rates of bit change for a sorting unit. The packed data arrangement changing unit 412 selects a sorting case in which the rate for every bit of currently output packed data with respect to the previously output packed data is lowest among the predetermined cases shown in FIG. 6, based on the calculated rates of bit changes. The packed data arrangement changing unit 412 generates packed data obtained by sorting the arrangement of pixel data in the currently output packed data for every sorting unit so that the selected sorting cases are arranged.

In the arrangement of data in the packed data shown in FIG. 7B, the sorting case 2 is selected when the packed data is changed from the packed data for the first transfer to the packed data for the second transfer, and the sorting case 3 is selected when the packed data is changed from the packed data for the second transfer to the packed data for the third transfer. When the packed data is changed from the packed data for the third transfer to the packed data for the fourth transfer, the sorting information obtained by sorting the arrangement of pixel data in the packed data for each of the transfers is added (coupled) to unused bits of the packed data for the fourth transfer, and hence the sorting case 1, in which the sorting process is not performed, is selected.

The packed data arrangement changing unit 412 couples the value of sorting information corresponding to the selected sorting case to the unused bits (in FIG. 7, bits (25 to 31) of the packed data for the fourth transfer) of the packed data for the fourth transfer. More specifically, sorting information ("01") corresponding to the sorting case 2 is coupled to bits (25 and 26) of the packed data for the fourth transfer, and sorting information ("10") corresponding to the sorting case 3 is coupled to bits (27 and 28) of the packed data for the fourth transfer. Sorting information ("00") corresponding to the sorting case 1 is coupled to bits (29 and 30) of the packed data for the fourth transfer.

As such, in the packing method in accordance with the first preferred embodiment of the present invention, the packed data obtained by sorting the arrangement of pixel data in the transferred packed data is generated for every memory access (one transfer) of one cycle in the burst transfer, so that it is possible to decrease each rate of bit change in the memory bus between burst transfers. Accordingly, in the packing method in accordance with the first preferred embodiment of the present invention, it is possible to maintain the same transfer efficiency of image data as the conventional packing method in a burst unit and to reduce power consumption related to the transfer of image data as compared with the conventional packing method in a burst unit.

The number of combinations for sorting the arrangement of pixel data in the transferred packed data for every sorting unit is set to a predetermined number of combinations, thereby decreasing the bit number of the sorting information. Accordingly, the rate of bits used in the sorting information in the packed data is decreased, so that it is possible to prevent the efficiency of the burst transfer from being lowered and to prevent the scale of the circuit related to the selection of the sorting case from being increased.

In the packing method in accordance with the first preferred embodiment of the present invention, a case in which the number of combinations for sorting the arrangement of pixel data in the transferred packed data is set to a predetermined number of combinations, thereby decreasing the bit number used in the sorting information, has been described. However, the bit number used in the sorting information may be decreased using other methods. For example, the bit number used in the sorting information may be increased by increasing the bit number for the sorting unit, e.g., 16 bits or 2 bytes. The method of arranging data when changing the bit number for the sorting unit is identical to the method of generating packed data, shown in FIGS. 4A, 4B, 4C, 4D and 4E, except that bit numbers for the sorting unit are changed, its detailed description will be omitted.

Next, the method of changing an output order of packed data (output order changing method) in the data conversion unit 41 included in the image pickup device 1 in accordance with the first preferred embodiment of the present invention will be described. In the image pickup device 1 in accordance with the first preferred embodiment of the present invention, for example, the data conversion unit 41 generates packed data arranged in the memory bus using input pixel data, and the data inverse conversion unit 52 restores the input packed data to the original pixel data. Thus, although the order of the packed data output by the data conversion unit 41, the data inverse conversion unit 52 restores the order of the input packed data to the order of the original pixel data, so that the series of processes can be performed with no problem in the image pickup device 1 in accordance with the first preferred embodiment of the present invention. In the following description, a case in which each pixel data in the Bayer data shown in FIG. 14 is sequentially input to the data conversion unit 41, and four transfers are packed as packed as packed data for one burst set as one packing unit will be described. Therefore, a description will be given on the assumption that that the bit number of each pixel data in the Bayer data is 11 and the memory bus width is 32 bits.

The method in which the data inverse conversion unit 52 restores the order of the packed data to the order of the original pixel data is reverse to the method in which the data conversion unit 41 changes the output order of the packed data, and hence, its detailed description will be omitted.

Data Output Order Changing Method

FIGS. 8A and 8B are diagrams illustrating an example of packed data of which an output order is changed by the data conversion unit 41 included in the image pickup device 1 in accordance with the first preferred embodiment of the present invention. FIG. 8A shows transferred packed data generated by the conventional data arranging (packing) method for the burst unit, i.e., transferred packed data in which bits of pixel data are arranged by the packed data generation unit 411. FIG. 8B shows the arrangement of data in the packed data in which the output order of the packed data is changed in the output order changing method in accordance with the first preferred embodiment of the present invention, i.e., in which the arrangement of pixel data in the transferred packed data is changed in the aforementioned packing method.

When the arrangement of pixel data in the transferred packed data is changed according to the aforementioned packing method, the packed data arrangement changing unit 412 changes the order of the transferred packed data (four packed data in FIGS. 8A and 8B) in advance, so that each rate of bit change in the memory bus can be decreased between transfers (between two consecutive transfers) in the burst transfer.

In the data output order changing method in accordance with the first preferred embodiment of the present invention, the packed data arrangement changing unit 412 has, for example, a memory unit for temporally storing 32-bit transferred packed data for one burst, i.e., a packing unit (four transfers), and changes the order of the transferred packed data on which a sorting process is performed when the arrangement of pixel data in the transferred packed data is changed. The packed data arrangement changing unit 412 changes the arrangement of pixel data in transferred packed data corresponding to subsequently output packed data according to the aforementioned packing method, based on the arrangement of pixel data in transferred packed data corresponding to the initially output packed data as reference transferred packed data in the current burst transfer. The order in which the packed data arrangement changing unit 412 outputs packed data is predetermined The packed data arrangement changing unit 412 performs a sorting process of the transferred packed data based on the predetermined output order of the packed data, and sequentially outputs the packed data after the sorting process is performed.

The order identical to the output order of the packed data, set by the packed data arrangement changing unit 412, is also predetermined as an input order of the packed data in the packed data arrangement changing unit 521 included in the data inverse conversion unit 52. Accordingly, the packed data arrangement changing unit 521 can recognize packed data having sorting information added to an unused bit thereof The packed data arrangement changing unit 412 generates the original transferred packed data from the input packed data using a method reverse to the aforementioned packing method based on the predetermined input order of the packed data.

Here, an example in which the output order of the packed data is changed according to the data output order changing method in accordance with the first preferred embodiment of the present invention will be described with reference to FIGS. 8A and 8B. In the following description, a case in which the output order of the packed data is reverse to the order in which the transferred packed data is inputted to the packed data arrangement changing unit 412, i.e., in which the transferred packed data for first to fourth transfers are output in the order of fourth transfer→third transfer→second transfer→first transfer, will be described. Thus, the output order of the packed data, which indicates the order of fourth transfer→third transfer→second transfer→first transfer, is predetermined in the packed data arrangement changing unit 412.

First, the packed data arrangement changing unit 412 stores all transferred packed data for one burst (four transfers) input from the packed data generation unit 411 in the memory unit included therein. In the example shown in FIGS. 8A and 8B, the transferred packed data from the first transfer to the fourth transfer, shown in FIG. 8A, is stored in the memory unit included in the packed data arrangement changing unit 412. The stored transferred packed data is sequentially output in the predetermined output order of the packed data. It will be readily understood that, for example, the transferred packed data stored in the memory unit in the packed data arrangement changing unit 412 is sequentially input as the input data DIN in the packed data arrangement changing unit 412 shown in FIG. 3.

Next, the packed data arrangement changing unit 412 sets the initially output transferred packed data for the fourth transfer as reference transferred packed data in the current burst transfer. Since the sorting process of the reference transferred packed data is not performed, the reference transferred packed data is output as the packed data for the first transfer. However, there are unused bits (bits (25 to 31) of the packed data for the first transfer in FIGS. 8A and 8B) in the packed data for the first transfer. For this reason, after the selection of all sorting cases is finished, the value of corresponding sorting information is necessarily coupled to the unused bits. Thus, the packed data for the first transfer is stored in the memory unit included in the packed data arrangement changing unit 412.

The memory unit for storing the transferred packed data for the fourth transfer and the memory unit for storing the packed data for the first transfer may be identical to or different from each other. When the memory unit for storing the transferred packed data for the fourth transfer and the memory unit for storing the packed data for the first transfer are identical to each other, the memory unit may be implemented into a configuration in which the transferred packed data for the fourth transfer is output and the packed data for the first transfer is then stored again. When the memory unit for storing the transferred packed data for the fourth transfer and the memory unit for storing the packed data for the first transfer are different from each other, the memory unit for storing the packed data for the first transfer may be included in the data coupling unit 4126.

Next, the packed data arrangement unit 412 compares the value of each bit of the packed data for the first transfer with the value of each bit of subsequently output transferred packed data (transferred packed data for the third transfer, shown in FIG. 8A), and calculates rates of bit change for the sorting unit. The packed data arrangement changing unit 412 selects a sorting case in which the rate for every bit of the subsequently output packed data with respect to the packed data for the first transfer is lowest among the predetermined cases shown in FIG. 6 based on the calculated rates of bit change. The packed data arrangement changing unit 412 generates packed data (packed data for the second transfer, shown in FIG. 8B) obtained by sorting, for every sorting unit, the arrangement of pixel data in the subsequently output packed data for the third transfer so that the selected sorting cases are arranged.

Then, the packed data arrangement changing unit 412 selects sorting cases respectively corresponding to the packed data for the third transfer and the packed data for the fourth transfer, shown in FIG. 8B. In the arrangement of data in the packed data shown in FIG. 8B, a case in which the sorting case 2 is selected when the packed data is changed from the packed data for the first transfer to the packed data for the second transfer, the sorting case 3 is selected when the packed data is changed from the packed data for the second transfer to the packed data for the third transfer, and the sorting case 3 is selected when the packed data is changed from the packed data for the third transfer to the packed data for the fourth transfer is described. The packed data arrangement changing unit 412 generates the packed data for the third and fourth transfers of which the sorting process is performed so that the selected sorting cases are arranged. Like the packed data for the first transfer, the generated packed data for the second to fourth transfers is stored in the memory units for storing the packed data. This is because the packed data containing the sorting information is the packed data for the first transfer, and hence a subsequent output of the packed data is performed after the packed data for the first transfer is output. Thus, when the packed data containing the sorting information is, for example, the packed data for the third transfer, the packed data for the first and second transfers may be sequentially output after the sorting process is performed. The configuration of the memory unit for storing the packed data is identical to that of the memory unit for storing the packed data for the first transfer, and the memory units are provided respectively corresponding to the packed data.

After the selection of all the sorting cases is finished, the packed data arrangement changing unit 412 couples the value of sorting information corresponding to the packed data for the second to fourth transfers to unused bits of the packed data for the first transfer, stored in the memory unit for storing the packed data, and outputs the packed data for the first transfer having the sorting information added to the unused bits thereof. More specifically, as shown in FIG. 8B, sorting information ("01") corresponding to the sorting case 2 is coupled to bits (25 and 26) of the packed data for the first transfer, sorting information ("10") corresponding to the sorting case 3 is coupled to bits (27 and 28) of the packed data for the first transfer, and sorting information ("11") corresponding to the sorting case 4 is coupled to bits (29 and 30) of the packed data for the first transfer.

Next, the packed data arrangement changing unit 412 sequentially outputs packed data posterior to the packed data for the second transfer, stored in the memory unit, based on the predetermined output order of the packed data. Accordingly, the packed data is sequentially output in the predetermined output order of the packed data from the data conversion unit 41. More specifically, as shown in FIG. 8B, the packed data corresponding to those for the fourth, third, second and first transfers, shown in FIG. 8A, is sequentially output in the output order of the first, second, third and fourth transfers.

As such, in the data output order changing method in accordance with the first preferred embodiment of the present invention, the order of the output packed data is changed, so that the sorting process for the packed data for the fourth transfer can be performed. That is, in the packing method shown in FIGS. 7A and 7B, the sorting information is added, and therefore, the positions of bits, to which the sorting information is added, are necessarily fixed. Hence, the transferred packed data of which the sorting process can be performed is only the packed data for the second and third transfers. In the data output order changing method in accordance with the first preferred embodiment of the present invention, the order of the output packed data is changed, so that the packed data having the sorting information added to unused bits thereof is set to the packed data for the first transfer. Hence, the sorting process of the packed data for the fourth transfer can be performed. Accordingly, the data output order changing method in accordance with the first preferred embodiment of the present invention can further reduce power consumption related to the transfer of pixel data as compared to the aforementioned packing method (shown in FIGS. 7A and 7B).

As described above, in the data conversion units 41 and 51 included in the image pickup device 1 in accordance with the first preferred embodiment of the present invention the packed data arrangement changing unit 412 compares each bit data of the pixel data in the transferred packed data for every predetermined sorting unit (e.g., one byte), and sorts the arrangement of the pixel data in the transferred packed data in the range of the predetermined combination. Thus, the arrangement of the pixel data in the transferred packed data can be changed so that each rate of bit change in the memory bus is decreased between two consecutive transfers in the burst transfer. Accordingly, in the data conversion units 41 and 51 included in the image pickup device 1 in accordance with the first preferred embodiment of the present invention, it is possible to maintain the same transfer efficiency of image data as the conventional packing method in a burst unit and to reduce power consumption related to the transfer of image data as compared with the conventional packing method in a burst unit. Further, it is possible to reduce power consumption related to the transfer of pixel data between the memory 20 and each component (processing block) in the image pickup device 1, i.e., the transfer of pixel data between components in the image pickup device 1.

In the data conversion units 41 and 51 included in the image pickup device 1 in accordance with the first preferred embodiment of the present invention, the pixel data in the transferred packed data can be sorted for every sorting unit based on the predetermined sorting combination, and thus it is possible to minimize an increase in the scale of the circuit related to the selection of sorting cases.

In the data conversion units 41 and 51 included in the image pickup device 1 in accordance with the first preferred embodiment of the present invention, the output order of the packed data obtained by sorting the pixel data in the transferred packed data can be changed based on the predetermined output order of the packed data. Accordingly, the effect when the pixel data in the transferred packed data is sorted for every sorting unit can be sufficiently obtained.

As can be seen from the contents described above, the positions of bits in the packed data, to which the sorting information is added, are necessarily fixed. In other words, if the positions of bits in the packed data to which the sorting information is coupled are fixed, the sorting process of sorting units other than the sorting unit containing the bits in the packed data to which the sorting information is added can be performed on the packed data having the sorting information added to unused bits thereof For example, in the arrangement of data in the packed data shown in FIG. 7B, the sorting unit containing the bits to which the sorting information is added (1-byte sorting unit containing bits (24 to 31)) can be fixed to only the fourth transfer. For this reason, similar to the predetermined sorting case shown in FIG. 6, the sorting case for performing a sorting process for the units 0 to 2 of the sorting case 1 shown in FIG. 6 is predetermined corresponding to the fourth transfer, and the sorting case having the lowest rate of bits of the packed data may be selected from the sorting case corresponding to the fourth transfer. Accordingly, the sorting process of the packed data for the fourth transfer can be performed, and the power conduction related to the transfer of pixel data can be further reduced.

The data processing apparatus and data processing method in which the packing method and data output order changing method in accordance with the first preferred embodiment of the present invention are applied to the Bayer data have been described in the first preferred embodiment of the present invention. However, the data processing apparatus and data processing method in accordance with the first preferred embodiment of the present invention are not limited to the application to the Bayer data, and may be applied to various image data such as RGB data, YCbCr data of YC422 or YC444 sequential format and OSD data. The packing method and data output order changing method in accordance with the first preferred embodiment of the present invention are not limited to the application to the image data, and may be applied to different forms of data such as voice data.

Application Example

Next, an example in which the packing method in accordance with the first preferred embodiment of the present invention is applied to a different form of image data or data other than the image data will be described. In the packing method in accordance with the first preferred embodiment of the present invention, a case in which the arrangement of data is selected when the pixel data in the transferred packed data is sorted in a sorting unit from the sorting case shown in FIG. 6 will be described. The case in which the data output order changing method in accordance with the first preferred embodiment of the present invention is applied to a different form of image data or data other than the image data can be similar to that in the data output order changing method described above, and therefore, its detailed description will be omitted.

First, an example in which the packing method in accordance with the first preferred embodiment of the present invention is applied to RGB data will be described. FIGS. 9A and 9B are diagrams illustrating an embodiment in which the method of arranging (packing) data performed by the data conversion unit 41 included in the image pickup device 1 in accordance with the first preferred embodiment of the present invention is applied to other image data (RGB data). FIG. 9A shows an example in which the conventional packing method for the burst unit is applied to 10-bit RGB data, i.e., an example of the transferred packed data in which each bit of the pixel data is arranged by the packed data generation unit 411. FIG. 9B shows an example of the arrangement of data in the packed data in which the arrangement of pixel data in the transferred packed data is changed by the packing method in accordance with the first preferred embodiment of the present invention.

As shown in FIG. 9A, the packed data generation unit 411 generates transferred packed data in which RGB data (10 bits×3 colors=30 bits) is simply arranged. As shown in FIG.

9B, the packed data arrangement changing unit 412 compares each bit data of the pixel data in the transferred packed data for every predetermined sorting unit (e.g., one byte) according to the packing method in accordance with the first preferred embodiment of the present invention, and the arrangement of the pixel data in the transferred packed data is sorted in the range of a predetermined combination. Accordingly, the packed data arrangement changing unit 412 generates packed data obtained by sorting the arrangement of the pixel data in the transferred packed data so that each rate of bit change in the memory bus is decreased between 2 transfers in the burst transfer.

In the example of FIGS. 9A and 9B, the sorting case 4 is selected when the packed data is changed from the packed data for the first transfer to the packed data for the second transfer, and the sorting case 2 is selected when the packed data is changed from the packed data for the second transfer to the packed data for the third transfer. When the packed data is changed from the packed data for the third transfer to the packed data for the fourth transfer, the sorting information obtained by sorting the arrangement of pixel data in the packed data for each of the transfers is added (coupled) to unused bits of the packed data for the fourth transfer, and hence the sorting case 1 is selected.

The packed data arrangement changing unit 412 couples the sorting information corresponding to the selected sorting case to the unused bits (bits (24 to 31)) of the packed data for the fourth transfer. More specifically, sorting information ("11") corresponding to the sorting case 4 is coupled to bits (24 and 25) of the packed data for the fourth transfer, and sorting information ("01") corresponding to the sorting case 2 is coupled to bits (26 and 27) of the packed data for the fourth transfer. Also, sorting information ("00") corresponding to the sorting case 1 is coupled to bits (28 and 29) of the packed data for the fourth transfer. Accordingly, each rate of bit change of the four packed data can be decreased, and the power consumption related to the transfer of image data can be reduced.

FIGS. 10A, 10B and 10C are diagrams illustrating an example in which the method of arranging (packing) data performed by the data conversion unit 41 included in the image pickup device 1 in accordance with the first preferred embodiment of the present invention is applied to a different form of image data (YCbCr data). FIG. 10B shows an example in which the conventional packing method is applied to 10-bit Y data, 8-bit Cb and Cr data as shown in FIG. 10A, i.e., an example of transferred packed data in which bits of pixel data are arranged by the packed data generation unit 411. FIG. 10C shows an example of the arrangement of data in packed data in which the arrangement of the pixel data in the transferred packed data is changed by the packing method in accordance with the first preferred embodiment of the present invention.

As shown in FIG. 10B, the packed data generation unit 411 generates transferred packed data in which the YCbCr data is simply arranged. As shown in FIG. 10C, the packed data arrangement changing unit 412 compares each bit data of the pixel data in the transferred packed data for every predetermined sorting unit (e.g., one byte) according to the packing method in accordance with the first preferred embodiment of the present invention, and the arrangement of the pixel data in the transferred packed data is sorted in the range of a predetermined combination. Accordingly, the packed data arrangement changing unit 412 generates packed data obtained by sorting the arrangement of the pixel data in the transferred packed data so that each rate of bit change in the memory bus is decreased between 2 transfers in the burst transfer.

In the example of FIGS. 10A, 10B and 10C, the sorting case 3 is selected when the packed data is changed from the packed data for the firs transfer to the packed data for the second transfer is selected, and the sorting case 4 is selected when the packed data is changed from the packed data for the second transfer to the packed data for the third transfer is selected. When the packed data is changed from the packed data for the third transfer to the packed data for the fourth transfer, the sorting information obtained by sorting the arrangement of pixel data in the packed data for each of the transfers is added (coupled) to unused bits of the packed data for the fourth transfer, and hence the sorting case 1 is selected.

The packed data arrangement changing unit 412 couples the sorting information corresponding to the selected sorting case to the unused bits (bits (22 to 31)) of the packed data for the fourth transfer. More specifically, sorting information ("10") corresponding to the sorting case 3 is coupled to bits (22 and 23) of the packed data for the fourth transfer, and sorting information ("11") corresponding to the sorting case 4 is coupled to bits (24 and 25) of the packed data for the fourth transfer. Also, sorting information ("00") corresponding to the sorting case 1 is coupled to bits (26 and 27) of the packed data for the fourth transfer. Accordingly, each rate of bit change of the four packed data can be decreased, and the power consumption related to the transfer of image data can be reduced.

Figures 11A, 11B:
FIGS. 11A and 11B are diagrams illustrating an example in which the method of arranging data performed by the data conversion unit included in the image pickup device in accordance with the first preferred embodiment of the present invention is applied to a different form of data.
Figure 13:
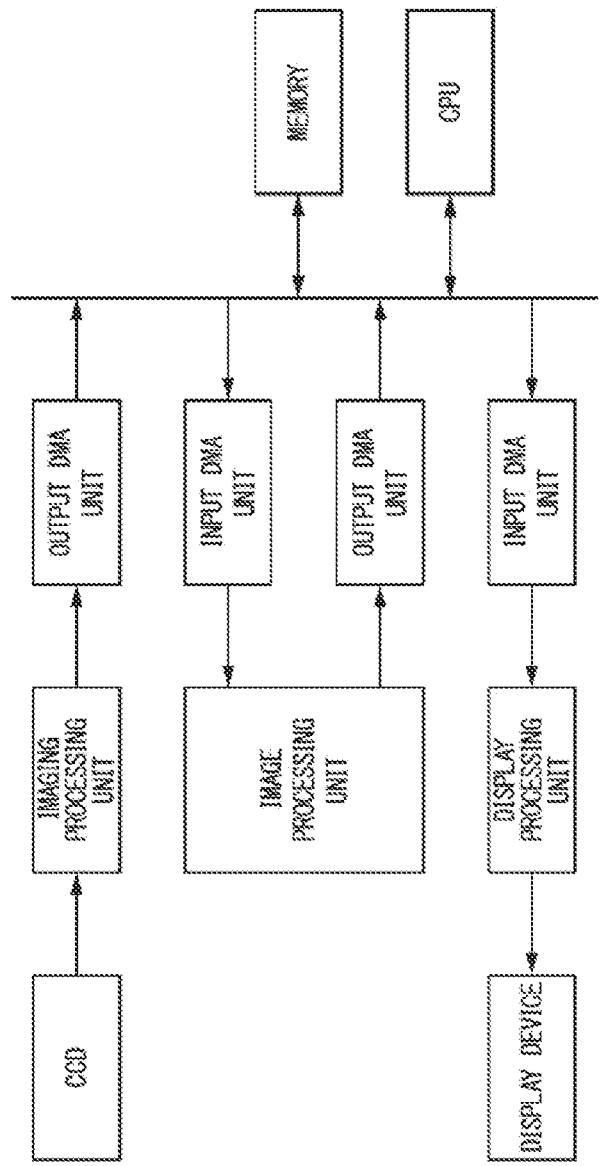
FIG. 13 is a block diagram illustrating a schematic configuration of an image pickup device in accordance with the related art.
Figures 15A, 15B:
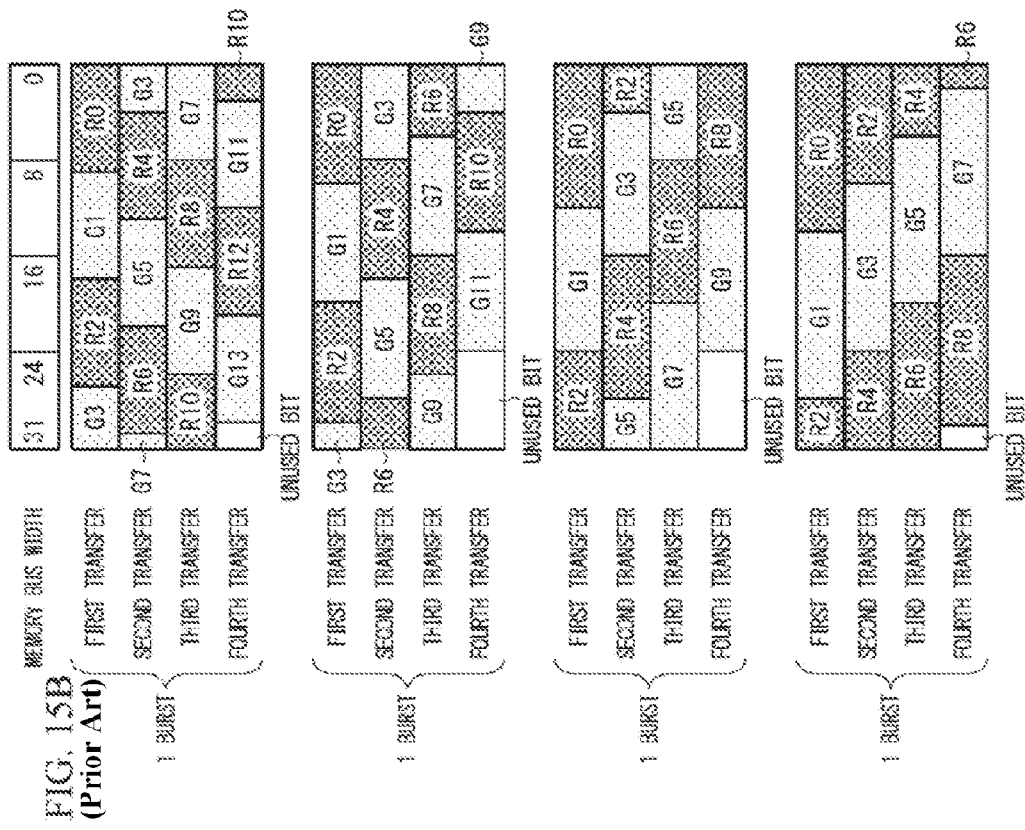
FIGS. 15A and 15B are diagrams illustrating an example of pixel data packing in accordance with the related art.
Figure 16A:
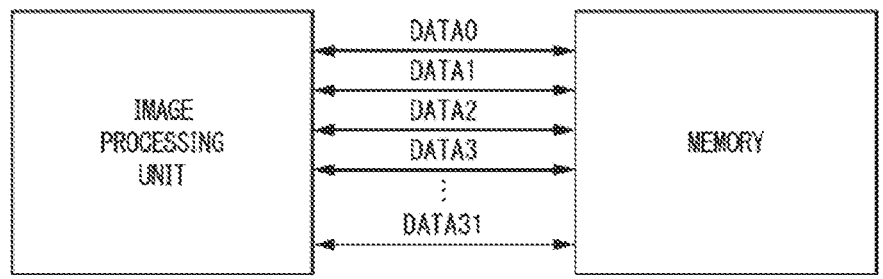
FIGS. 16A, 16B, 16C and 16D are diagrams illustrating a relationship between a data change on a data bus and a power consumption.
Figure 16B:
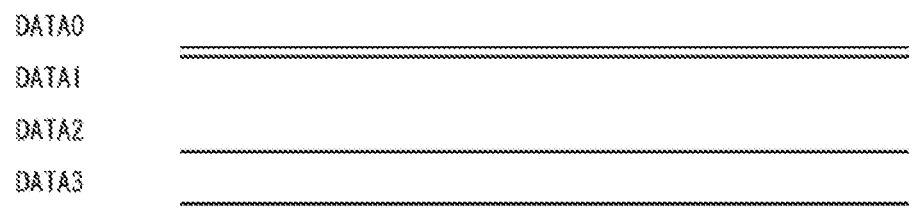
Figure 16C:
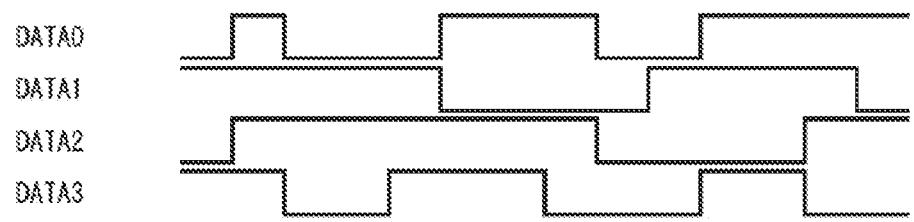
Figure 16D:
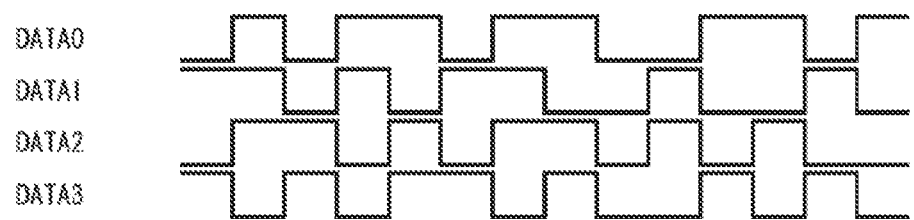
Figure 17A:
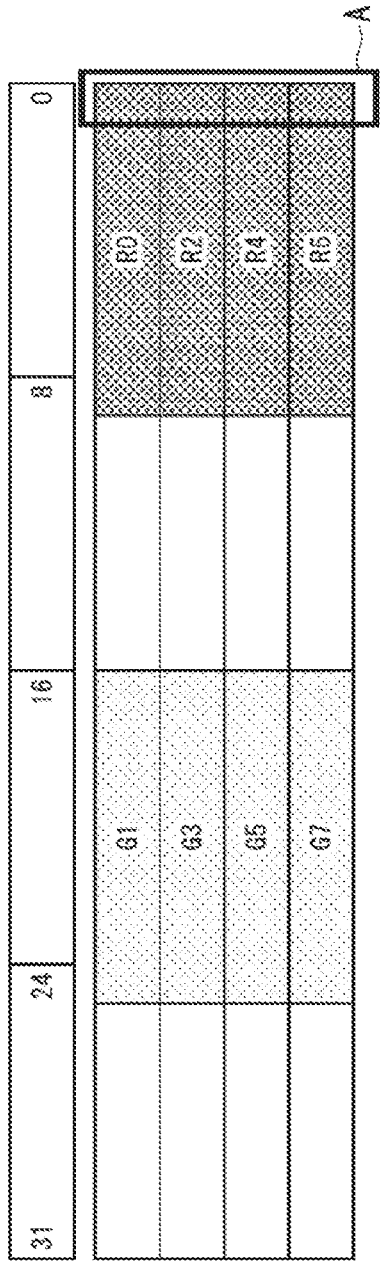
FIGS. 17A and 17B are diagrams illustrating an example of a data arrangement state in a pixel data packing method in accordance with the related art.
Figure 17B:
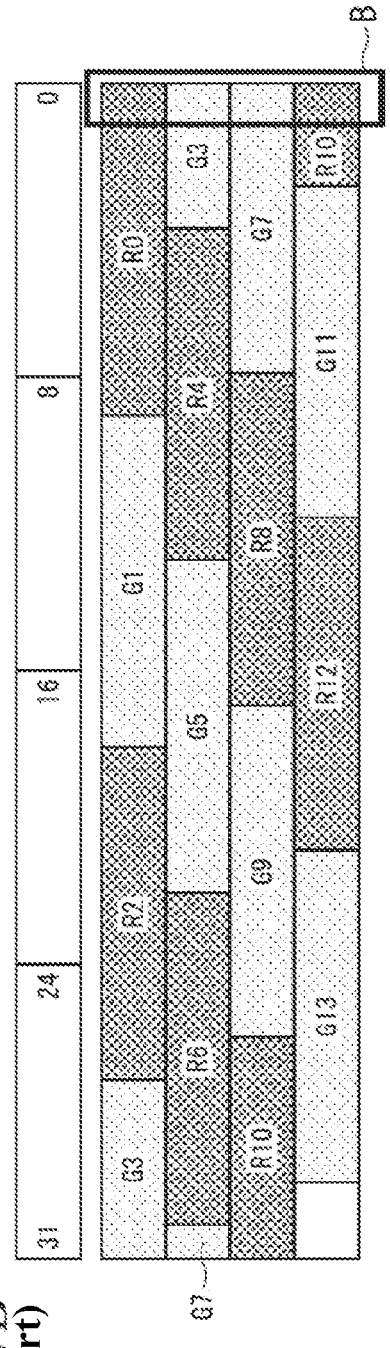
Figure 18:
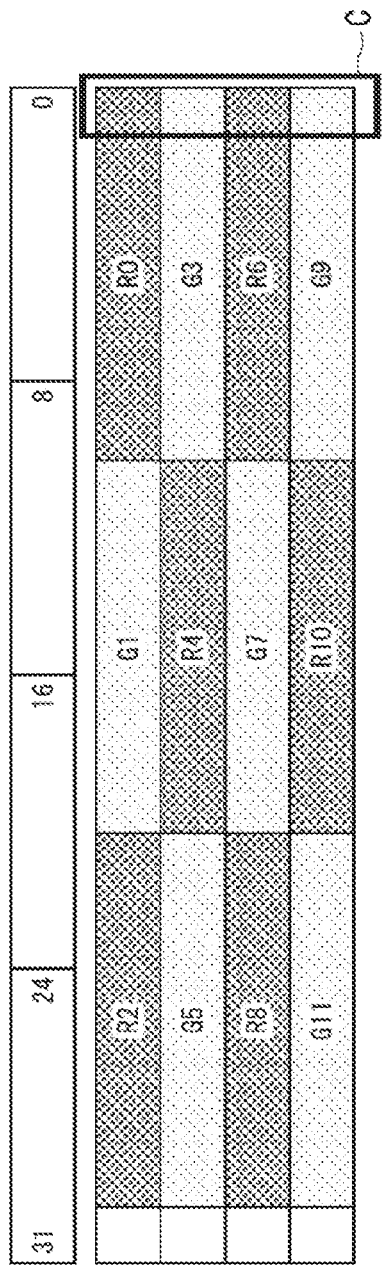
FIG. 18 is a diagram illustrating another example of a data arrangement state in the pixel data packing method in accordance with the related art.

FIGS. 11A and 11B are diagrams illustrating an example in which the method of arranging (packing) data performed by the data conversion unit 41 included in the image pickup device 1 in accordance with the first preferred embodiment of the present invention is applied to a different form of data (OSD data). FIG. 11A shows an example in which the conventional packing method is applied to 6-bit OSD data, i.e., an example of transferred packed data in which bits of pixel data are arranged by the packed data generation unit 411. FIG. 11B shows an example of the arrangement of data in packed data in which the arrangement of the pixel data in the transferred packed data is changed by the packing method in accordance with the first preferred embodiment of the present invention.

As shown in FIG. 11A, the packed data generation unit 411 generates transferred packed data in which the OSD data is simply arranged. As shown in FIG. 11B, the packed data arrangement changing unit 412 compares each bit data of the pixel data in the transferred packed data for every predetermined sorting unit (e.g., one byte) according to the packing method in accordance with the first preferred embodiment of the present invention, and the arrangement of the pixel data in the transferred packed data is sorted in the range of a predetermined combination. Accordingly, the packed data arrangement changing unit 412 generates packed data obtained by sorting the arrangement of the pixel data in the transferred packed data so that each rate of bit change in the memory bus is decreased between 2 transfers in the burst transfer.

In the example of FIGS. 11A and 11B, the sorting case 3 is selected when the packed data is changed from the packed data for the first transfer to the packed data for the second transfer, and the sorting case 2 is selected when the packed data is changed from the packed data for the second transfer to the packed data for the third transfer. When the packed data is changed from the packed data for the third transfer to the packed data for the fourth transfer, the sorting information obtained by sorting the arrangement of pixel data in the packed data for each of the transfers is added (coupled) to unused bits of the packed data for the fourth transfer, and hence the sorting case 1 is selected.

The packed data arrangement changing unit 412 couples the value of the sorting information corresponding to the selected sorting case to the unused bits (bits (24 to 31)) of the packed data for the fourth transfer. More specifically, sorting information ("10") corresponding to the sorting case 3 is coupled to bits (24 and 25) of the packed data for the fourth transfer, and sorting information ("01") corresponding to the sorting case 2 is coupled to bits (26 and 27) of the packed data for the fourth transfer. Also, sorting information ("00") corresponding to the sorting case 1 is coupled to bits (28 and 29) of the packed data for the fourth transfer. Accordingly, each rate of bit change of the four packed data can be decreased, and the power consumption related to the transfer of image data can be reduced.

FIGS. 12A and 12B are diagrams illustrating an example in which the method of arranging (packing) data performed by the data conversion unit 41 included in the image pickup device 1 in accordance with the first preferred embodiment of the present invention is applied to a different form of data (voice data). In FIGS. 12A and 12B, a case in which 24-bit R (right) data and 24-bit L (left) data are applied to a 64-bit memory bus is described. FIG. 12A shows an example in which the conventional packing method is applied, i.e., an example of transferred packed data in which bits of pixel data are arranged by the packed data generation unit 411. FIG. 12B shows an example of the arrangement of data in packed data in which the arrangement of the pixel data in the transferred packed data is changed by the packing method in accordance with the first preferred embodiment of the present invention. In FIGS. 12A and 12B, a case in which the sorting unit for sorting the arrangement of voice data in the transferred packed data is set to 2 bytes (16 bits), and the sorting unit in the sorting case shown in FIG. 6 is changed into a sorting unit for every two byte, thereby selecting the sorting case, is described.

As shown in FIG. 12A, the packed data generation unit 411 generates transferred packed data in which the voice data is simply arranged. As shown in FIG. 12B, the packed data arrangement changing unit 412 compares each bit data of the pixel data in the transferred packed data for every predetermined sorting unit (e.g., two bytes) according to the packing method in accordance with the first preferred embodiment of the present invention, and the arrangement of the pixel data in the transferred packed data is sorted in the range of a predetermined combination. Accordingly, the packed data arrangement changing unit 412 generates packed data obtained by sorting the arrangement of the pixel data in the transferred packed data so that each rate of bit change in the memory bus is decreased between 2 transfers in the burst transfer.

In the example of FIGS. 12A and 12B, the sorting case 4 is selected when the packed data is changed from the packed data for the first transfer to the packed data for the second transfer, and the sorting case 3 is selected when the packed data is changed from the packed data for the second transfer to the packed data for the third transfer. When the packed data is changed from the packed data for the third transfer to the packed data for the fourth transfer, the sorting information obtained by sorting the arrangement of pixel data in the packed data for each of the transfers is added (coupled) to unused bits of the packed data for the fourth transfer, and hence the sorting case 1 is selected.

The packed data arrangement changing unit 412 couples the value of the sorting information corresponding to the selected sorting case to the unused bits (bits (48 to 63)) of the packed data for the fourth transfer. More specifically, sorting information ("11") corresponding to the sorting case 4 is coupled to bits (48 and 49) of the packed data for the fourth transfer, and sorting information ("10") corresponding to the sorting case 3 is coupled to bits (50 and 51) of the packed data for the fourth transfer. Also, sorting information ("00") corresponding to the sorting case 1 is coupled to bits (52 and 53) of the packed data for the fourth transfer. Accordingly, each rate of bit change of the four packed data can be decreased, and the power consumption related to the transfer of image data can be reduced.

As described above, according to the embodiment of the present invention, bits of data in transferred packed data are compared for every predetermined sorting unit, and the arrangement of data in the transferred packed data is changed for every sorting unit. Information obtained by changing the arrangement of data in the transferred packed data is added to unused bits of packed data, and the packed data is output. Thus, each rate of bit change in the memory bus can be decreased between two consecutive transfers in a burst transfer, and the transferred packed data can be easily restored to the original transferred packed data. Further, the transfer efficiency of data can be maintained identically to the conventional transfer efficiency of data. Accordingly, it is possible to sufficiently reduce power consumption related to the transfer of data between a memory and each component (processing block) in the image pickup device.

According to the embodiment of the present invention, the order of the packed data for each packing unit is changed. Accordingly, each rate of bit change in the memory bus can be further decreased between two consecutive transfers in the burst transfer.

According to the embodiment of the present invention, when the arrangement of data in the transferred packed data is changed, the number of combinations for arranging data is set to a predetermined number of combinations. Thus, the number of combinations for arranging data in the transferred packed data is increased, and the bit number used in sorting information is increased, so that it is possible to prevent an increase in the rate of bits used in the sorting information in the transferred packed data. Further, the number of combinations for arranging data in the transferred packed data is increased, so that it is possible to prevent an increase in the scale of a circuit related to the selection of sorting cases. Accordingly, it is possible to prevent the transfer efficiency of data from being lowered.

While the case in which four transfers form a burst transfer unit and one burst is a data packing unit has been described in the present embodiment, the number of transfers in one burst transfer and the data packing unit is not limited to the embodiment of the present invention. For example, 64 transfers may form the burst transfer unit and 16 transfers in one burst may be the data packing unit, that is, four packing units may be included in one burst. Alternatively, for example, 16 transfers may form the data packing unit and eight transfers may form the burst transfer unit, that is, the packing unit may include two burst transfers.

While the case in which the packing method when data delivery between components in the image capturing apparatus is performed is applied to some data has been described in the present embodiment, an application scope of the packing method of the present embodiment is not limited to the embodiment of the present invention, and the packing method may be applied to any system in which data delivery is performed between components.

While the example in which the data conversion unit is arranged as a preceding processing block before the output DMA unit and the data inverse-conversion unit is arranged as a subsequent processing block after the input DMA unit has been described in the present embodiment, the arrangements of the data conversion unit and the data inverse-conversion unit are not limited to the embodiment of the present invention. For example, the data conversion unit may be a component of the output DMA unit and the data inverse-conversion unit may be a component of the input DMA unit. Furthermore, for example, the data conversion unit may be a component of a preceding image capturing processing unit and the data inverse-conversion unit may be a component of a subsequent image processing unit.

While preferred embodiments of the present invention have been described and illustrated above, it should be understood that these are examples of the present invention and are not to be considered as limiting. Additions, omissions, substitutions, and other modifications can be made without departing from the scope of the present invention. Accordingly, the present invention is not to be considered as being limited by the foregoing description, and is only limited by the scope of the claims.

What is claimed is:

1. A data processing apparatus comprising:
a data conversion unit that arranges input data in each transfer data in the conversion unit using one transfer data as one transfer unit and a predetermined number of transfer units as one conversion unit when converting a plurality of input data input sequentially into transfer data having a bit number identical to a predetermined bit number of a data bus and sequentially transferring the converted transfer data,
wherein the data conversion unit comprises:
a data generation unit configured to generate first transfer data in which the input data is sequentially arranged in the data bus; and
a first data arrangement changing unit configured to divide the bit width of the data bus into a plurality of unit bits having a predetermined bit number, generate conversion data obtained by sorting the arrangement of data arranged in the first transfer data for every unit bit, and output the generated conversion data and sorting information indicating the sorted arrangement of data in the conversion data as the transfer data in the data conversion unit,
wherein the first data arrangement changing unit comprises:
a bit change number calculating unit configured to compare a value of each bit in the conversion data output at an n-th (n is a natural number of 1 or more) time from the first data arrangement changing unit with a value of each bit in the first transfer data input at an (n+1)-th time, and output, for every unit bit, the number of bits based on the comparison result set as a bit change number;
a bit change number analysis unit configured to determine whether or not the data in the first transfer data input at the (n+1)-th time is sorted in units of the unit bit based on the bit change number for every unit bit, and output the determination result;
a first data sorting unit configured to sort the data in the first transfer data at the (n+1)-th time in units of the unit bit and generate sorting data based on the determination result; and
a data coupling unit configured to generate coupling data obtained by coupling information indicating the determination result as the sorting information, in the position of a predetermined unused bit of the sorting data containing the unused bit in the sorting data in which data is not arranged, and output any one of the sorting data and the generated coupling data as the conversion data in the first data arrangement changing unit.

2. The data processing apparatus of claim 1, wherein the bit change number calculating unit:
divides the conversion data output at the n-th time into first reference data and second reference data for every bit number of the unit bits;
divides the first transfer data input at the (n+1)-th time into first comparison target data and second comparison target data for every bit number of the unit bits; and
outputs a first bit change number obtained by comparing the first comparison target data with the first reference data, a second bit change number obtained by comparing the second comparison target data with the first reference data, a third bit change number obtained by comparing the first comparison target data with the second reference data and a fourth bit change number obtained by comparing the second comparison target data with the second reference data.

3. The data processing apparatus of claim 2, wherein the bit change number analysis unit determines an arrangement of data for every unit bit in the first transfer data input at the (n+1)-th time, in which the number of bits whose values become different values when a value of each bit of the conversion data output at the n-th time is changed into a value of each bit of the first transfer data input at the (n+1)-th time, based on the first, second, third and fourth bit change numbers input from the bit change number calculating unit, and determines whether or not the arrangement of data in the first transfer data input at the (n+1)-th time is sorted in units of the unit bit based on the determined data arrangement.

4. The data processing apparatus of claim 2, wherein:
combinations of arrangement positions of the unit bits on the data bus when the arrangement of data in the first transfer data input at the (n+1)-th time is sorted in units of the unit bit are predetermined; and
the bit change number analysis unit selects, from the predetermined combinations of the arrangement positions, a combination of the arrangement positions of data for every unit bit in the first transfer data input at the (n+1)-th time, in which the number of bits whose values become different values when a value of each bit of the conversion data output at the n-th time is changed into a value of each bit of the first transfer data input at the (n+1)-th time, based on the first, second, third and fourth bit change numbers input from the bit change number calculating unit, and outputs information of the selected combination of the arrangement positions as the determination result of determining whether or not the arrangement of data in the first transfer data input at the (n+1)-th time is sorted in units of the unit bit.

5. The data processing apparatus of claim 3 or 4, wherein:
when the transfer data is output in the conversion unit, an output order of the conversion data output as the transfer data is predetermined; and
the data coupling unit outputs any one of the sorting data and the coupling data as the conversion data, based on the predetermined output order of the conversion data.

6. A data processing apparatus comprising:
a data inverse conversion unit configured to convert a plurality of input data into transfer data having a bit number identical to a predetermined bit number of a data bus, sequentially inverse-convert transfer data sequentially transferred for every conversion unit using one transfer data as one transfer unit and the transfer unit of a predetermined number as one conversion unit, and restore the inverse-converted transfer data to the plurality of original input data, wherein the data inverse conversion unit comprises:
a second data arrangement changing unit configured to generate first transfer data in which the data processing apparatus as a transfer source of the transfer data sequentially arranges the input data as the transfer data in the data bus, divide the bit width of the data bus into a plurality of unit bits having a predetermined bit number, generate conversion data obtained by sorting an arrangement of data arranged in the first transfer data for every unit bit, and return the conversion data to the first transfer data by sorting the arrangement of data arranged in the conversion data to the arrangement position of the original input data for each unit bit so that the generated conversion data and sorting information indicating the arrangement of the sorted data in the conversion data is input from the data bus as the transfer data from the data processing apparatus as the transfer source of the transfer data to restore the arrangement of data arranged in the input conversion data to the original arrangement; and
a data restoring unit configured to restore, to the input data, the input data contained in the first transfer data of which arrangement is returned to the original arrangement of the input data,
wherein the second data arrangement changing unit comprises:
a data storage unit configured to store all the transfer data contained in the conversion unit as the conversion data by sequentially storing the transfer data sequentially transferred for every conversion unit whenever the transfer data is transferred;
a sorting information storage unit configured to store sorting information coupled in a predetermined bit position of any one of the transfer data when the data processing apparatus as the transfer source of the transfer data sorts the arrangement of data arranged in the first transfer data for every unit bit; and
a second data sorting unit configured to sequentially generate the first transfer data in which data in the conversion data stored in the data storage unit is sorted in the original arrangement in units of the unit bit, based on the sorting information stored in the sorting information storage unit.

7. The data processing apparatus of claim 6, wherein:
combinations of arrangement positions of the unit bits on the data bus when the arrangement of data in the conversion data is sorted in the original arrangement in units of the unit bit are predetermined; and
the second data sorting unit selects a combination of arrangement positions corresponding to the conversion data to be currently processed from the predetermined combinations of arrangement positions based on information on the combinations of arrangement positions contained in the sorting information, and generates the first transfer data obtained by sorting the data in the conversion data to be currently processed to the original arrangement based on the selected combination of arrangement positions.

8. The data processing apparatus of claim 7, wherein:
when the data processing apparatus as the transfer source of the transfer data outputs the transfer data in the conversion unit, an output order of the conversion data output as the transfer data is predetermined; and
the second data sorting unit sequentially selects the conversion data stored in the data storage unit, based on the predetermined output order of the conversion data, so that the order of the generated first transfer data becomes the original order of the first transfer data generated by the data processing apparatus as the transfer source of the transfer data, and sequentially generates the first transfer data obtained by sorting the data in the selected conversion data to the original arrangement.

9. A data processing method comprising:
a data conversion step of, when converting a plurality of input data input sequentially into transfer data having a bit number identical to a predetermined bit number of a data bus and sequentially transferring the converted transfer data, arranging the input data in each transfer data in the conversion unit using one transfer data as one transfer unit and a predetermined number of transfer units as one conversion unit,
wherein the data conversion step comprises:
a data generation step of generating first transfer data in which the input data is sequentially arranged in the data bus; and
a first data arrangement changing step of dividing the bit width of the data bus into a plurality of unit bits having a predetermined bit number, generating conversion data obtained by sorting the arrangement of data arranged in the first transfer data for every unit bit, and outputting the generated conversion data and sorting information indicating the sorted arrangement of data in the conversion data as the transfer data in the data conversion unit,
wherein the first data arrangement changing step comprises:
a bit change number calculating step of comparing a value of each bit in the conversion data output at an n-th (n is a natural number of 1 or more) time from the first data arrangement changing unit with a value of each bit in the first transfer data input at an (n+1)-th time, the number of bits based on the compared result is set to a bit change number, and outputting, for every unit bit, the number of bits based on the comparison result set as a bit change number;
a bit change number analysis step of determining whether or not the data in the first transfer data input at the (n+1)-th time is sorted in units of the unit bit based on the bit change number for every unit bit, and outputting the determination result;
a first data sorting step of generating the data in the first transfer data as sorting data sorted in units of the unit bit based on the determination result; and
a data coupling step of generating coupling data obtained by coupling information indicating the determination result as the sorting information, in the position of a predetermined unused bit of the sorting data containing the unused bit in the sorting data in which data is not arranged, and outputting any one of the sorting data and the generated coupling data as the conversion data in the first data arrangement changing unit.

10. A data processing method comprising:
a data inverse conversion step of converting a plurality of input data into transfer data having a bit number identical to a predetermined bit number of a data bus, sequentially inverse-converting transfer data sequentially transferred for every conversion unit using one transfer data as one transfer unit and the transfer unit of a predetermined number as one conversion unit, and restoring the inverse-converted transfer data to the plurality of original input data,
wherein the data inverse conversion step comprises:
a second data arrangement changing step of generating first transfer data in which the data processing apparatus as a transfer source of the transfer data sequentially arranges the input data as the transfer data in the data bus, divides the bit width of the data bus into a plurality of unit bits having a predetermined bit number, generates conversion data obtained by sorting an arrangement of data arranged in the first transfer data for every unit bit, and returns the conversion data to the first transfer data by sorting the arrangement of data arranged in the conversion data to the arrangement position of the original input data for each unit bit so that the generated conversion data and sorting information indicating the arrangement of the sorted data in the conversion data is input from the data bus as the transfer data from the data processing apparatus as the transfer source of the transfer data so as to restore the arrangement of data arranged in the input conversion data to the original arrangement; and a data restoration step of restoring, to the input data, the input data contained in the first transfer data of which arrangement is returned to the original arrangement of the input data, wherein the second data arrangement changing step comprises:

a data storage step of storing all the transfer data contained in the conversion unit as the conversion data by sequentially storing the transfer data sequentially transferred for every conversion unit whenever the transfer data is transferred;

a sorting information storage step of storing sorting information coupled in a predetermined bit position of any one of the transfer data when the data processing apparatus as the transfer source of the transfer data sorts the arrangement of data arranged in the first transfer data for every unit bit; and a second data sorting step of sequentially generating the first transfer data in which data in the conversion data stored in the data storage unit is sorted in the original arrangement in units of the unit bit, based on the sorting information stored in the sorting information storage unit.

* * * * *